(12) United States Patent
Hara et al.

(10) Patent No.: US 7,446,775 B2
(45) Date of Patent: Nov. 4, 2008

(54) DATA PROCESSOR AND GRAPHIC DATA PROCESSING DEVICE

(75) Inventors: Hirotaka Hara, Koganei (JP); Hiroyuki Hamasaki, Kodaira (JP); Mitsuhiro Saeki, Kodaira (JP); Kazuhiro Hirade, Kokubunji (JP); Makoto Takano, Sayama (JP)

(73) Assignee: Renesas Technology Corp., Tokyo (JP)

( * ) Notice: Subject to any disclaimer, the term of this patent is extended or adjusted under 35 U.S.C. 154(b) by 126 days.

(21) Appl. No.: 10/891,047

(22) Filed: Jul. 15, 2004

(65) Prior Publication Data

US 2005/0030311 A1 Feb. 10, 2005

(30) Foreign Application Priority Data

Aug. 7, 2003 (JP) ............................. 2003-206466

(51) Int. Cl.
*G06F 13/14* (2006.01)
*G06F 13/36* (2006.01)
(52) U.S. Cl. ........................ 345/519; 345/520; 710/308; 710/309; 710/312
(58) Field of Classification Search ................. 345/519, 345/520; 710/308, 312, 309
See application file for complete search history.

(56) References Cited

U.S. PATENT DOCUMENTS

| 5,434,959 | A | * | 7/1995 | Von Ehr et al. ............. 345/441 |
| 6,058,459 | A | * | 5/2000 | Owen et al. ................. 711/151 |
| 6,128,026 | A | * | 10/2000 | Brothers, III ............... 345/539 |
| 6,525,738 | B1 | * | 2/2003 | Devins et al. ............... 345/553 |
| 6,535,217 | B1 | * | 3/2003 | Chih et al. .................. 345/519 |
| 6,608,625 | B1 | * | 8/2003 | Chin et al. .................. 345/501 |
| 6,631,431 | B1 | * | 10/2003 | Silvkoff et al. .............. 710/100 |
| 6,701,405 | B1 | * | 3/2004 | Adusumilli et al. ......... 710/308 |
| 6,754,509 | B1 | * | 6/2004 | Khan et al. ............... 455/556.1 |
| 6,947,057 | B2 | * | 9/2005 | Nelson et al. ............... 345/611 |
| 2003/0039409 | A1 | * | 2/2003 | Ueda .......................... 382/298 |
| 2003/0218608 | A1 | | 11/2003 | Chin et al. .................. 345/419 |
| 2004/0046761 | A1 | * | 3/2004 | Hellman et al. ............. 345/502 |

FOREIGN PATENT DOCUMENTS

JP 06-028486 2/1994
JP 2003-208631 7/2003

* cited by examiner

*Primary Examiner*—Ulka Chauhan
*Assistant Examiner*—Daniel Washburn
(74) *Attorney, Agent, or Firm*—Miles & Stockbridge P.C.

(57) ABSTRACT

An object of the present invention is to improve efficiency of transfer of control information, graphic data, and the like for drawing and display control in a graphic data processor. A graphic data processor includes: a CPU; a first bus coupled to the CPU; a DMAC for controlling a data transfer using the first bus; a bus bridge circuit for transmitting/receiving data to/from the first bus; a three-dimensional graphics module for receiving a command from the CPU via the first bus and performing a three-dimensional graphic process; a second bus coupled to the bus bridge circuit and a plurality of first circuit modules; a third bus coupled to the bus bridge circuit and second circuit modules; and a memory interface circuit coupled to the first and second buses and the three-dimensional graphic module and connectable to an external memory, wherein the bus bridge circuit can control a direct memory access transfer between an external circuit and the second bus.

12 Claims, 20 Drawing Sheets

THICK LINE OBTAINED BY DRAWING LINE HAVING WIDTH 1 FIVE TIMES

DATA PROCESSOR AND GRAPHIC DATA PROCESSING DEVICE

CROSS-REFERENCE TO RELATED APPLICATION

The present application claims priority from Japanese patent application JP 2003-206466 filed on Aug. 7, 2003, the content of which is hereby incorporated by reference into this application.

BACKGROUND OF THE INVENTION

The present invention relates to a graphic data processor formed on a semiconductor chip and, more particularly, to a technique effective when applied to fields requiring graphic data processing of, for example, a car information system, a set-top box, a digital TV, a mobile communication system, a digital sound terminal, a media terminal, a portable terminal, and the like.

Japanese Unexamined Patent Publication No. 2003-208631 (FIG. 32) describes a graphic processor for performing a three-dimensional graphics process. Japanese Unexamined Patent Publication No. Hei 6(1994)-28486 (FIG. 1) discloses a graphic processor having a thick line drawing function.

The inventors herein have examined optimization of transfer of control information and data for drawing and display control in a graphic data processor. A graphic data processor examined by the inventors prior to the present invention has therein a pixel bus and an I/O bus, and a central processing unit (also simply described as CPU) accesses an external data memory via a CPU interface and the pixel bus. To the CPU interface, a bus bridge circuit is connected. The bus bridge circuit has the role of a bridge of distributing data from the CPU to peripheral modules and transmitting data from the peripheral modules to the CPU. The bus bridge circuit has therein a direct memory access controller (DMAC) and can write data from the peripheral modules to the data memory via the pixel bus and transfer data in the data memory to the peripheral modules without using the CPU. Modules connected to the pixel bus, specifically, a graphic module, a CPU interface, and a bus bridge circuit can transfer data to/from the data memory. On the pixel bus, transfer among the modules is not supported.

SUMMARY OF THE INVENTION

The inventors have found that the graphic data processor has the following problems. First, since the CPU is provided on the outside of the graphic data processor and accesses the graphic data processor and the data memory via the CPU interface, data transfer latency deteriorates. Particularly, the system performance could be largely influenced by latency in an access to the data memory such as a synchronous DRAM (Dynamic Random Access Memory) and an access to the peripheral modules. Second, it is feared that transfer between a peripheral module and the data memory or transfer between the graphic module and the data memory and transfer between the CPU and the data memory compete with each other on the pixel bus. Such competition may deteriorate data processing speed of the CPU. Modules of graphic data processing are required to have a real-time performance, so that the priority on the bus has to be high. In this case, wait time until the CPU obtains the right of the pixel bus may become unnecessarily long. For example, in the case of employing the round robin method (a tournament in which each module competes with every other module) as an arbitration method, when the number of modules accessing the pixel bus increases, wait time for the bus right of the CPU becomes longer. Third, since there is no dedicated DMAC on the pixel bus, data from the CPU or a device on the CPU bus to the data memory has to be transferred by sequential transfer under control of the CPU or by using resources of a DMA channel of the CPU. Consequently, it is expected that the CPU is overloaded.

Further, the inventors herein also have examined thick line drawing by a two-dimensional graphic processor for performing two-dimensional drawing as one of graphic modules. The inventors have found that the thick line drawing has a problem such that, when a method of sequentially filling pixels from the start point to the end point with color is employed, if the drawing directions are different from each other, even if the number of lines in which pixels from the start and end points are filled with color is the same, the width of a thick line varies.

An object of the invention is to provide a graphic data processor realizing improved transfer efficiency of control information, image data, and the like for drawing and display control.

Another object of the invention is to provide a graphic data processor capable of suppressing deterioration in data transfer efficiency due to competition on a transfer path of graphic information and control information.

Further another object of the invention is to provide a graphic data processor having excellent performance from the viewpoint of enabling real-time drawing and display control to be performed on a large amount of graphic data.

The above and other objects and novel features of the invention will become apparent from the description of the specification and appended drawings.

An outline of representative ones of the inventions disclosed in the specification will be described briefly as follows.

[1] A graphic data processor according to the invention is laid out on a single semiconductor substrate or is included in one package comprising a plurality of chips including the graphic data processor and/or memories. This graphic data processor includes: a central processing unit; a first bus connected to the central processing unit; a direct memory access controller for controlling a data transfer using the first bus; a bus bridge circuit for transmitting/receiving data to/from the first bus; a three-dimensional graphics module for receiving a command from the central processing unit via the first bus and performing a three-dimensional graphic process; a second bus connected to the bus bridge circuit and a plurality of first circuit modules; a third bus connected to the bus bridge circuit and a second circuit module; and a memory interface circuit connected to the first and second buses and the three-dimensional graphic module and connectable to an external memory. The bus bridge circuit can control a direct memory access transfer between a circuit connected to the outside of the semiconductor chip and the second bus.

A two-dimensional graphic module for performing a two-dimensional graphic process such as a two-dimensional drawing process is provided as the first circuit module. As the first circuit module, for example, a display controller for performing display control on graphic data generated by the two-dimensional or three-dimensional graphics module is provided. As the second circuit module, for example, a GPS (Global Positioning System) module is provided.

With the means, by directly connecting the central processing unit to the first bus, it becomes unnecessary to interpose a bus controller and the like between them. The speed of a data transfer with the central processing unit can be increased by the amount. In the case where the central processing unit has a super scalar structure of issuing a plurality of commands in one cycle, the command processing capability about twice as high as the operating frequency can be obtained. When an object to be accessed, which is necessary for executing the command, is an external memory coupled via the first bus, the access speed is controlled to the access efficiency on the first bus. At this time, by connecting only the first circuit modules selected from the viewpoint of the degree of importance of realizing higher speed of the graphic data processing to the first bus, increase in wait time caused by access competition on the first bus is suppressed and it can contribute to improve the data processing speed of the central processing unit.

Since only the CPU and the DMA serve as bus masters on the first bus, the case where the CPU waits for a transfer request on the first bus hardly occurs. The first circuit modules such as the graphic processing module are subjected to arbitration in advance by a bus arbitration logic for the second bus. After the graphic processing circuit module truly requested to have real-time response is selected, bus right arbitration on the first bus between the CPU and the three-dimensional graphic module is executed. The graphic processing circuit module is requested to have real-time response, that is, high throughput performance but is not requested to achieve access latency reduced as much as that of the CPU. The bus arbitration logic in the memory interface circuit executes bus right arbitration among three requests of an access request from the three-dimensional graphic module, an access request from the circuit module connected to the first subs, and an access request using the second bus. Therefore, only the CPU and modules truly requiring high-speed transfer can be connected to the first bus, so that the higher speed of the bus can be easily achieved. Since the first circuit modules such as the graphic processing module is arbitrated by the bus arbitration logic on the second bus, real-time response performance of the graphic processing circuit modules is not substantially disturbed.

Since the first and second buses are separated from each other, collision between an access to a peripheral circuit module of the CPU and memory data transfer of the graphic processing circuit module hardly occurs. Therefore, without deteriorating the latency of the CPU access, data transfer with the peripheral circuit module can be performed.

By connecting the three-dimensional graphic processor to the first bus, necessity of performing a transfer of operands such as commands and a large amount of vertex data with the three-dimensional graphic processor in a three-dimensional graphic process can be satisfied. Further, in the three-dimensional graphic process, a large amount of graphics data has to be frequently sent/received to/from the memory at the time of hidden-surface removal and texture mapping in the step of processing vertex data. As compared with the other graphic processing circuit modules, not only high throughput but also suppressed access latency is needed. With the configuration in which the three-dimensional graphic processor is directly connected to the memory interface circuit via a dedicated bus, the requirements can be satisfied.

As a concrete mode of the invention, the graphic data processor further has a fourth bus which is connected to the bus bridge circuit and can be used for register setting from the central processing unit to the plurality of first circuit modules. The bus bridge circuit can also execute a direct memory access between the second and third buses.

In the case where the central processing unit has a super scalar configuration capable of executing two commands in one cycle, preferably, the first bus has the number of bits which is twice as many as that of an internal bus of the central processing unit. Two sets of data of predetermined number of bits are prepared in a processing cycle of the central processor unit, and the prepared two sets of data can be transferred to the first bus in one bus cycle.

[2] At the time of drawing a thick line, the two-dimensional graphic processor obtains a drawing line width specifying vector for specifying drawing line width in a direction perpendicular to a center line specifying a drawing direction, obtains a rectangle of a thick line on the basis of a start point and an end point of the center line and the drawing line width specifying vector, obtains drawing coordinates of four vertexes corresponding to pixels by performing rounding process on logic coordinates of the four vertexes of the rectangle, and draws a region surrounded by the drawing coordinates of the four vertexes as a polygon.

At this time, the two-dimensional graphic module obtains a drawing line width specifying vector so that right and left parts of the vector become asymmetrical with respect to the center line in the drawing direction. Consequently, in the case where the length of one of the drawing line width specifying vectors increases by the rounding process, the other drawing line width specifying vector tends to be rounded to be shorter. As a result, expansion/contraction of the drawing width is canceled off as a whole or is rather lessened.

The two-dimensional graphic processor exceptionally assigns a pixel coordinate in the drawing direction in place of a pixel coordinate perpendicular to the drawing direction to a drawing coordinate with respect to a predetermined logic coordinate relatively apart from the pixel coordinate in the rounding operation. Consequently, the rounding direction is the direction of a tangent of a circle whose diameter is equal to the drawing width (thick line drawing direction). The center portion of four pixel lattice points is a portion in which a relatively large error is caused by the rounding process. Even when the rounding process is performed on such a portion, the length of the normal (width of the thick line) is just prevented from being increased/decreased.

As a concrete mode, the two-dimensional graphic processor determines whether a logic coordinate is the predetermined logic coordinate to which the pixel coordinate is exceptionally assigned or not by determining a region which is obtained by dividing a region formed by neighboring pixel coordinates into a plurality of regions and to which the logic coordinate belongs. Alternately, the two-dimensional graphic processor determines the position of the drawing coordinate exceptionally assigned in accordance with a quadrant to which the drawing line width specifying vector belongs on a two-dimensional coordinate system using the start point of the drawing line width specifying vector as a center.

In the thick line drawing process, by making the right and left parts asymmetrical with respect to the center of the thick line and performing rounding-off two-dimensionally in consideration of the axis to which a coordinate value is rounded without rounding coordinate values to one of the X and Y axes, a thick line can be drawn without variations in thickness in all of directions even at low resolution.

DETAILED DESCRIPTION OF THE PREFERRED EMBODIMENTS

Graphic Data Processor

Figure 1:
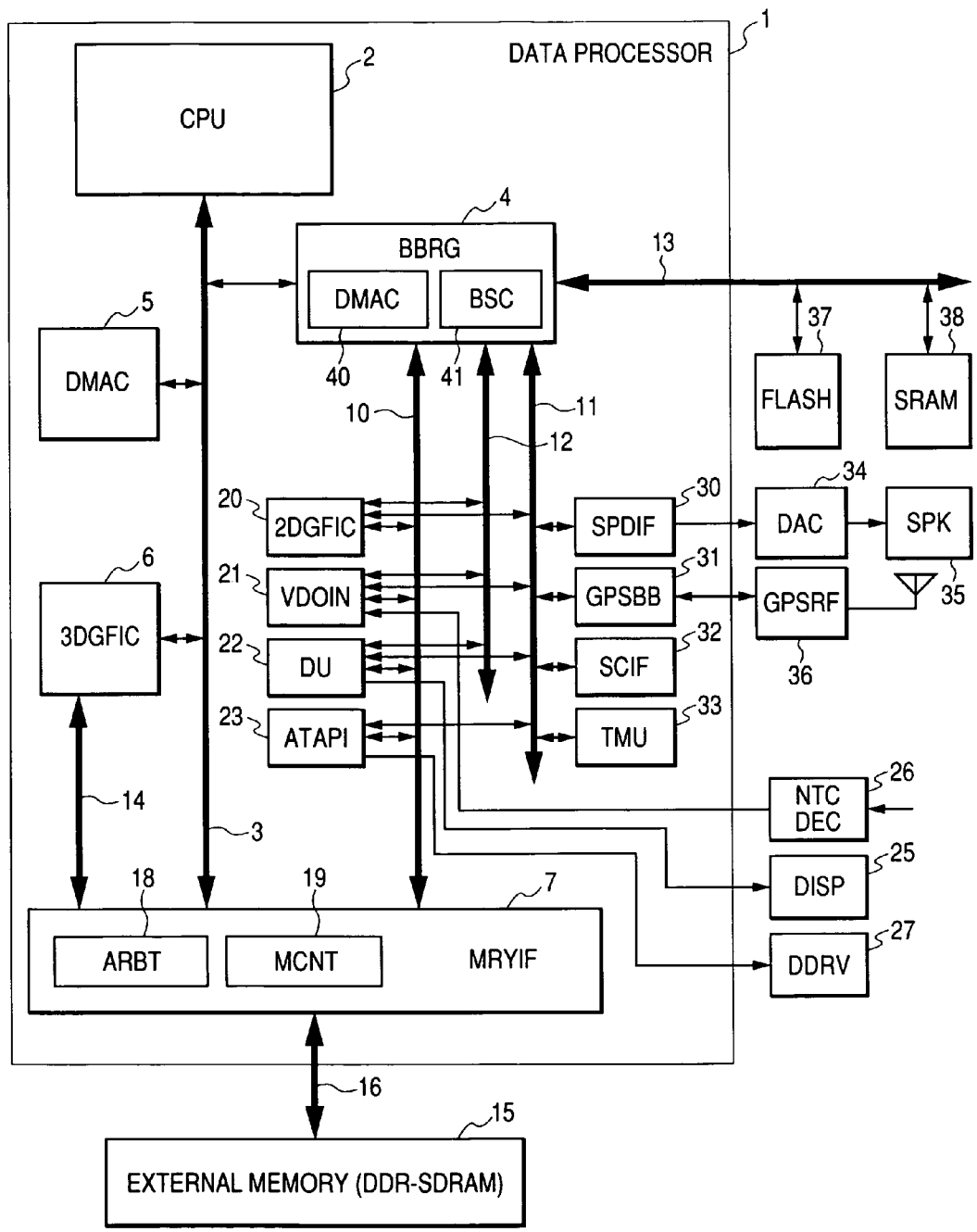
FIG. 1 is a block diagram showing a navigation system using a graphic data processor as an example of the invention.

FIG. 1 illustrates a navigation system using a graphic data processor according to an embodiment of the invention. A graphic data processor 1 shown in FIG. 1 is, although not limited, formed on a single semiconductor substrate (semiconductor chip) made of single crystal silicon or the like by a complementary MOS (CMOS) integrated circuit manufacturing technique, or the graphic data processor is included in one package comprising a plurality of semiconductor chips including graphic data processor and memory module or the like.

The graphic data processor 1 has therein a CPU (Central Processing Unit) 2. To a first bus 3 to which the CPU 2 is connected, a bus bridge circuit (BBRG) 4, a direct memory access controller (DMAC) 5, a 3D graphics module (3DG-FIC) 6 as a three-dimensional graphics data processing module for performing a three-dimensional graphic data processing such as a process of drawing a three-dimensional image, and a memory interface circuit (MRYIF) 7 are connected. The bus bridge circuit 4 is also connected to a second bus 10, a third bus 11, a fourth bus 12, and an external bus 13. To the memory controller 5, a 3D dedicated bus 14 is also connected.

To the memory interface circuit 7, an external memory 15 is connected via a memory bus 16. The external memory 15 is, for example, a double data rate-synchronous DRAM (DDR-SDRAM) and is used as a main memory used by the CPU and an image memory of a frame buffer or the like. The memory interface circuit 7 performs bus arbitration and memory control. The bus arbitration is a control of arbitrating conflicts of external memory accesses via the buses 3, 10, and 14 and is performed by a bus arbiter (ARBT) 18. The memory control is a control for operating the external memory 15 by generating a timing signal such as a strobe signal for making the external memory 15 perform reading or writing operation synchronously with the leading and trailing edges of a clock signal in response to an access request via a bus. The memory control is performed by a memory control logic (MCNT) 19. The external memory 15 is not limited to a DDR-SDRAM but may be a single data rate-synchronous DRAM (SDR-SDRAM) or the like.

The 3D graphics module 6 connected to the 3D dedicated bus 14 receives a graphic data processing command such as a 3D drawing command from the CPU 2 via the first bus 3 and performs a 3D drawing process. Drawing is performed on a frame buffer region in the external memory 15.

To the second bus 10, as first circuit modules, a 2D graphics module (2DGFIC) 20 as a two-dimensional graphic data processing part, a video signal input circuit (VDOIN) 21, a display control circuit (DU) 22, an AT attachment packet interface circuit (ATAPI) 23, and the like are connected. The 2D graphics module 20 is a circuit for performing a two-dimensional graphic data processing such as a process of drawing a two-dimensional image and has, for example, a thick line drawing function. Drawing is performed on the frame buffer region in the external memory 15. The display control circuit 22 executes a control of sequentially reading graphic data drawn in the frame buffer region in the external memory 15 and outputting the image data to a raster-scan display 25 synchronously with a display timing. The video signal input circuit 21 inputs a digital video signal. The digital video signal is output from an NTSC (National Television System Committee) decoder (NTCDEC) 26 for coding an analog video signal such as a television signal and outputting the resultant signal. The ATAPI 23 is connected to a disk drive (DDRV) 27 such as a hard disk drive, a DVD or CD-ROM drive, or the like and performs an interface control for reading recorded information from a recording medium such as a DVD or a CD-ROM and storing the information. In the navigation system, map data or the like is recorded in the DVD or CD-ROM.

To the fourth bus 12, the 2D graphics module 20, video signal input circuit 21, and display control circuit 22 are connected.

To the third bus 11, as second circuit modules, a sound data input/output interface (SPDIF) 30 which is in conformity with SPDIF, a GPS (Global Positioning System) baseband processor (GPSBB) 31, an asynchronous serial communication interface circuit (SCIF) 32, a timer (TMU) 33, and the like are connected. To the SPDIF 31, a digital/analog converter (DAC) 34 for sound is connected. A converted analog sound signal is converted to sound by a speaker 35. To the GPSBB 31, a radio frequency unit 36 for GPS (GPSRF) is connected. An electric wave is reflected by an artificial satellite via an antenna module and a satellite acquisition computing process or the like is executed.

To the external bus 13, an electrically rewritable flash memory (FLASH) 37 for storing a program, control data, and the like for navigation, a static random access memory (SRAM) 38 used as, for example, a work memory of the CPU 2, and the like are connected. In the case of constructing a multi-CPU system, although not shown, other processors can be also connected to the external bus 13.

The first bus 3 is a multi-master bus. Each of the circuit modules connected to the first bus 3 has a master port and a slave port independently. A read/write transfer request from a circuit module is issued as a command from the master port. A transfer request from another circuit module is subjected to arbitration in the bus arbiter. The resultant is notified as a transfer request to the slave port, and a bus transaction is executed. The bus arbiter is, although not shown, disposed in some midpoint of the first bus 3. By the multi-master bus control method, the first bus 3 can perform transfers of all of combinations of the circuit modules. For example, via the first bus 3, transfer between the CPU 2 and the DMAC 5, transfer between the bus bridge circuit 4 and the memory interface circuit 7, transfer between the bus bridge circuit 4 and the CPU 2, and the like can be performed.

The second bus 10 takes the form of a multi-master bus like the first bus 3 but one of the source and the destination of the second bus 10 is always the memory interface circuit 7. Specifically, via the second bus 10, each of the bus bridge circuit 4, 2DGFIC 20, VDOIN 21, DU 22, and ATAPI 23 performs only transfer with the external memory 15. Each of the graphic circuit modules 20, 21, 22, and 23 as the first circuit modules performs graphic data processing in its circuit block and, after that, has to temporarily store data into the external memory 15 or transfer the data in the external memory 15 to the display control circuit 22. All of transfers are made always via the memory 15. By limiting the transfers to transfers with the memory 15, there are advantages such that the configuration of the bus can be simplified and high-speed burst transfer can be performed. Further, all of the graphic circuit modules 20, 21, 22, and 23 are also connected to the third bus 11.

The third bus 11 is a bus for accessing registers to control, for example, an operation mode of a graphic circuit module and is used only for register reading/writing from the CPU 2.

The third bus 11 is a single master bus and the bus bridge circuit 4 is a bus master. As transfer methods, there are a case of converting a parallel input/output (PIO) transfer command from the CPU 2 to a transfer to the third bus 11 by the bus bridge circuit 4 and a case of performing a transfer between the peripheral circuit modules 30, 31, 32, and 33 as the second circuit modules and the external memory 15 by using a DMAC 40 built in the bus bridge circuit 4. In the latter case, the DMAC 40 plays the role of bridging between the third bus 11 and the second bus 10. For the second bus 10, the DMAC 40 issues as a bus mater a transfer request to the bus arbiter 18 in the memory interface circuit 7. For example, in the case of employing the configuration in which a satellite acquisition calculation is executed by the GPSBB 31 as an example of the peripheral circuit module and measurement calculation is executed by software by the built-in CPU 2, it is sufficient to send only necessary data on the third bus 11, that is, information of a captured satellite and time difference data from the GPSBB 31. Thus, the data transfer amount can be minimized and the system advantageous for achieving excellent cost-performance can be configured.

The 3D dedicated bus 14 is a dedicated bus for connecting the 3D graphics module 6 with the memory interface circuit 7. In this case, the advantages of the dedicated bus are utilized and the bus configuration in which latency is minimized is obtained.

The external bus 13 enables a PIO access from the CPU 2 and DMA transfer with the flash 37, SRAM 38, and external memory 15 by using the DMAC 40 in the bus bridge circuit 4. The bus bridge circuit 4 performs bus control of bus width, wait cycle insertion, and the like on the external bus 13 by a bus state controller (BSC) 41. The bus right arbitration on the third bus 11, fourth bus 12, and external bus 13 is performed by a not-shown bus arbitration logic in the bus bridge circuit 4.

The CPU 2 is, for example, a 32-bit CPU and its data processing unit is 32 bits. The CPU 2 has a super scalar structure of issuing a plurality of commands in one cycle, thereby having command process executing capability about twice as high as the operation frequency. That is, the CPU 2 has a so-called 2-way super scalar structure. Accordingly, the first bus 3 takes the form of a 64-bit bus. Therefore, the CPU 2 can execute two commands in parallel, prepare two sets of 32-bit data, and transfer the prepared two sets of data of total 64 bits to the first bus 3 in one bus cycle. The CPU 2 can also read 64-bit data from the first bus 3 in one bus cycle and concurrently compute the read lower 32 bits and the upper 32 bits separately.

In the graphic data processor 1 having the above-described configuration, the CPU 2 is directly connected to the first bus 3. Consequently, it is unnecessary to transfer data to the external memory via the bus controller, CPU bus, and CPU interface circuit in the CPU as in the graphic data processor of the comparative example of FIG. 2, so that the external memory access can be realized at much higher speed. Further, by integrating the CPU 2 onto the semiconductor chip on which the graphic data processor is also provided, it becomes unnecessary to connect the CPU and the graphic data processor to each other via the external bus unlike the comparative example of FIG. 2, and the internal bus of the semiconductor integrated circuit, which is much faster than the external bus, can be used. By employing the super scalar structure of issuing a plurality of commands per cycle, the CPU 2 can have command process executing capability which is about twice as high as the operation frequency. However, when an access is made to the external memory 15 via the first bus 3, the access speed is controlled by the access efficiency on the first bus 3 and the command processing capability value may deteriorate. Also with respect to this point, in the graphic data processor 1, by employing the configuration in which only the circuit modules 5 and 6 selected from the viewpoint of the degree of importance of realizing higher speed of the graphic data processing are connected to the first bus 3, increase in wait time caused by access competition on the first bus 3 is suppressed, and decrease in the operation speed of the CPU 2 can be effectively suppressed. In other words, it becomes easy to maintain the command execution speed by the CPU to be high.

Figure 2:
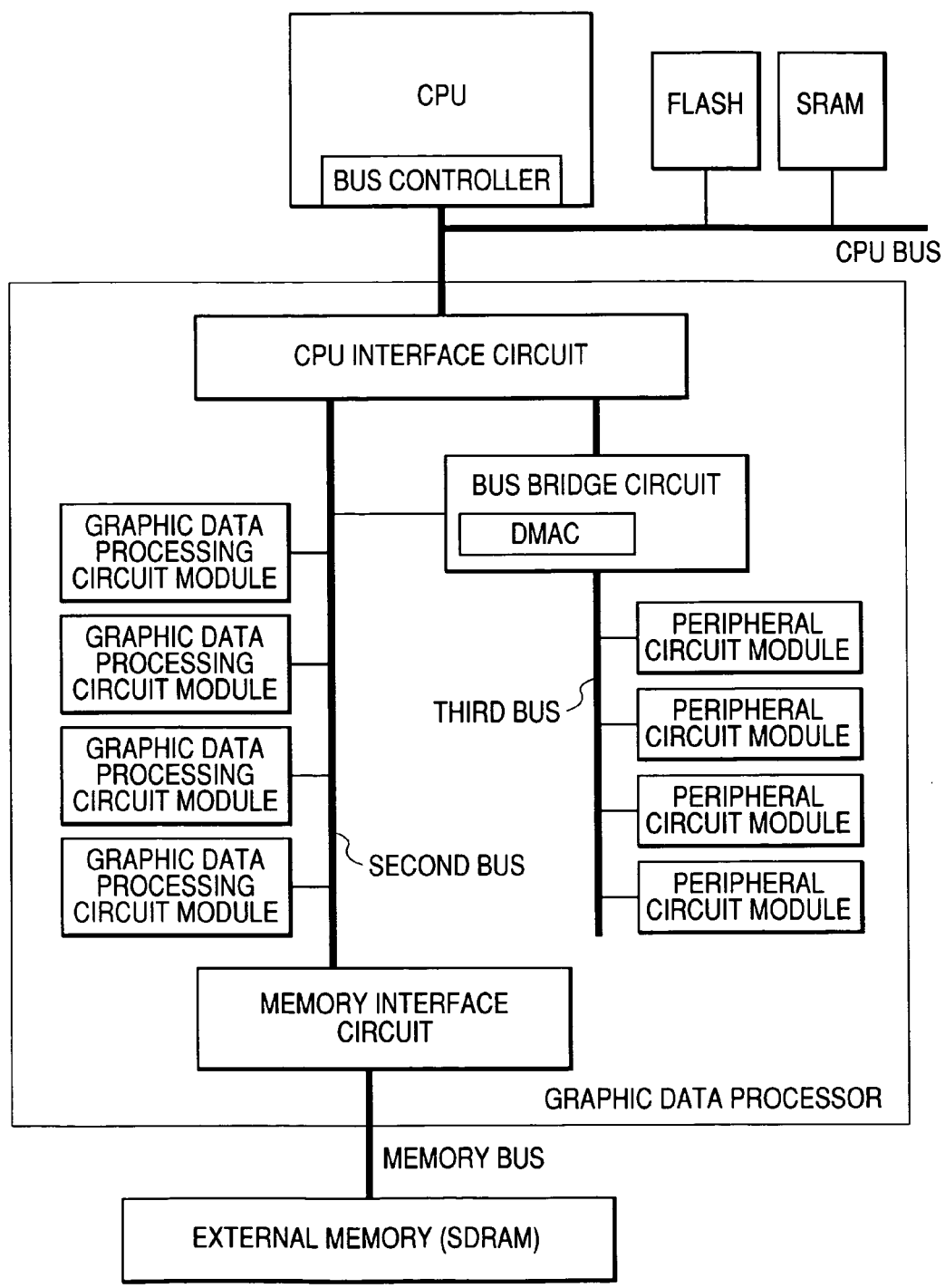
FIG. 2 is a block diagram showing a graphic data processor as a comparative example of the graphic data processor of FIG. 1.
Figure 3:
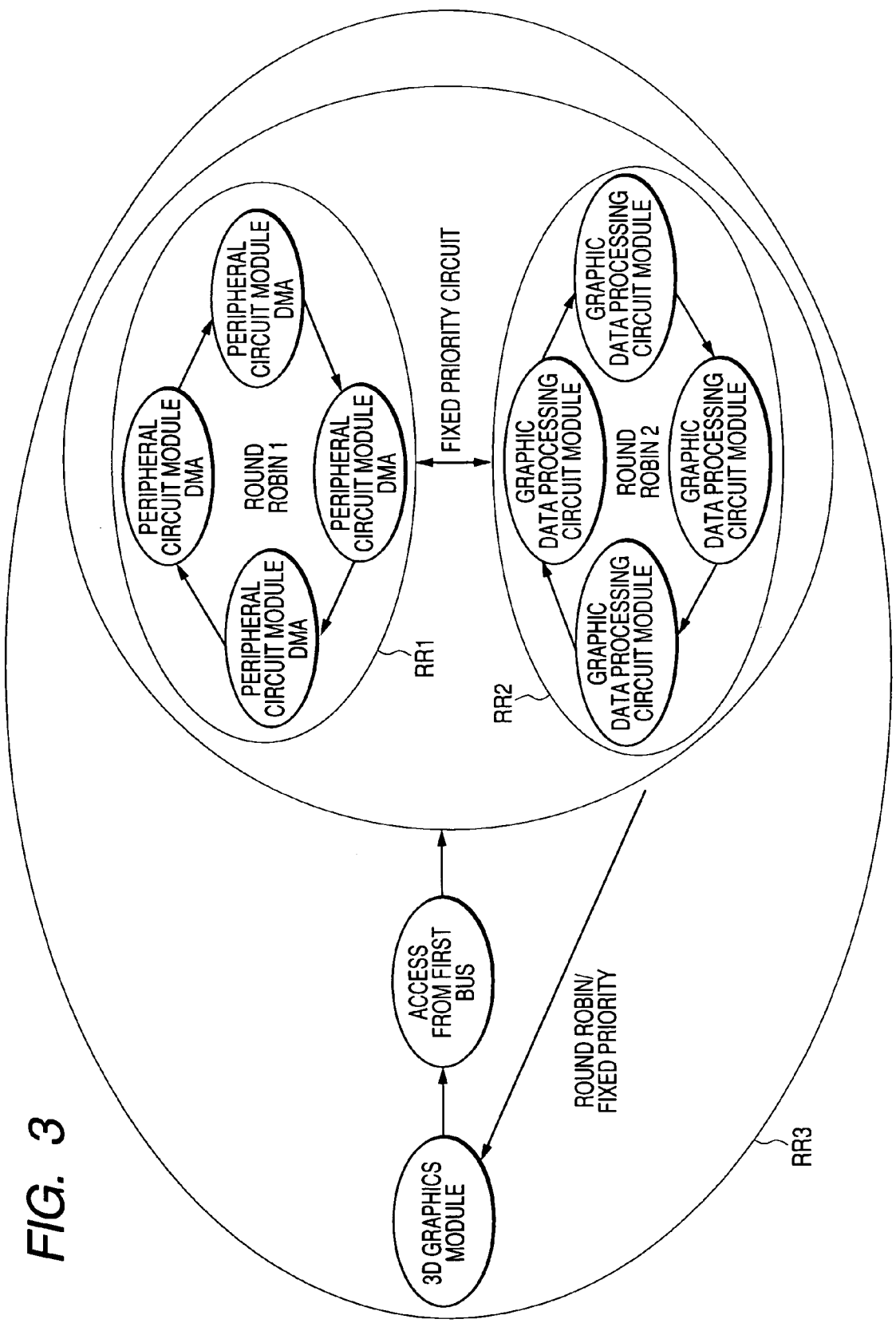
FIG. 3 is a diagram illustrating an algorism of bus arbitration by a bus arbiter in a memory interface circuit in the graphic data processor of FIG. 1.

In the case of the comparative example of FIG. 2, an access from the CPU is transmitted to the second bus via the CPU interface circuit and arbitration with the graphic processing circuit module is required in the second bus. Since real-time response is necessary for the graphic processing circuit module, a request from the CPU is regarded as a request having relatively low priority in this configuration. As a result, in some cases, the access latency of the CPU deteriorates. FIG. 3 shows an algorism of bus arbitration by the bus arbiter 18 in the memory interface circuit 7 in the graphic data processor 1 in FIG. 1. In the algorithm shown in FIG. 3, arbitration is performed in three levels. First, one request is selected from access requests to the peripheral circuit modules 30, 31, 32, and 33 from the third bus 11 via the bus bridge circuit 4 by a round robin method (round robin 1) RR1. One request is selected from access requests of the graphic processing circuit modules 20, 21, 22, and 23 via the second bus 10 by a round robin method (round robin 2) RR2. One of the selected two requests is selected by fixed priority. Usually, the graphic processing circuit module is requested to have real-time performance, so that priority is always given to the request from the graphic processing circuit module. The selected request of the graphic processing circuit module or periphery circuit module is subjected to arbitration by round robin/fixed priory RR3 between the 3D graphics module 6 and the access module from the first bus 3. The round robin/fixed priority means a method of giving priority to the graphic processing circuit module when a request is sent from the graphic processing circuit module and performing round robin equally on three requests when requests are made from the peripheral circuit modules. As compared with the comparative example of FIG. 2, in the configuration of FIG. 1, circuit modules sharing the first bus 3 are only the CPU 2, bus bridge circuit 4, DMAC 5, and 3D graphics module 6. In this case, the bus maters are only the CPU 2 and the DMAC 5, so that a case where the CPU 2 has to wait for a transfer request on the first bus 3 hardly occurs. The graphic processing circuit modules 20 to 23 are subjected to bus arbitration by the round robin RR2 on the second bus 10 side in advance. Consequently, after a graphic processing circuit module truly requested to have real time response is selected, arbitration with the CPU 2 and the 3D graphics module 6 is performed. The graphic processing circuit module is requested to have real-time response, that is, high throughput performance but is not requested to achieve access latency reduced as much as that of the CPU 2. Therefore, even when arbitration is performed at plural levels as shown by RR1 to RR3 as described above, total performance does not deteriorate. Moreover, an access request of the graphic processing circuit module which truly needs a response is selected, so that the CPU 2 does not have to wait unnecessarily. In short, in the case of performing bus arbitration by round robin on all of circuit modules including the CPU 2, the number of circuit modules competing with the CPU over the bus access requests increases and the probability that the bus access request is accepted cannot help decreasing. Therefore, by the configuration of FIG. 1, only the CPU 2 and the circuit modules truly requiring high-speed transfer can be connected to the first bus 3, so that the higher speed of the bus can be easily achieved. Further, requests from the graphic processing circuit modules are subjected to arbitration on the second bus 10 side, so that real-time performance necessary for the operation of the graphic processing circuit modules is not disturbed.

Also in DMA transfer between the external memory 15 and the peripheral circuit modules 30 to 33, collision with an access from the CPU 2 on the second bus 10 does not occur for the following reason. By separating the second bus 10 and the first bus 3 from each other, without deteriorating the access latency of the CPU 2, data transfer between the peripheral circuit modules and the external memory 15 via the third bus 11 can be performed.

As compared with the comparative example of FIG. 2, the 3D graphics module 6 is additionally provided. Usually, 3D graphics needs transfer of a large amount of data such as vertex data between the CPU 2 and the 3D graphics module 6. For this purpose, the 3D graphics module 6 is connected to the first bus 3 in FIG. 1. Further, in the 3D graphics, a large amount of graphics data has to be frequently sent/received to/from the memory at the time of hidden-surface removal and texture mapping in the step of processing vertex data. As compared with the other graphic processing circuit modules 20 to 23, not only high throughput but also suppressed access latency is needed. In consideration of this, the configuration in which the 3D graphics module 6 is directly connected to the memory interface circuit 7 via the dedicated bus 14 is employed. With this configuration, bus arbitration to the 3D graphics module 6 requires only one hierarchy of the round robin RR3, so that the access performance can be assured in a manner similar to the CPU 2.

Figure 4:
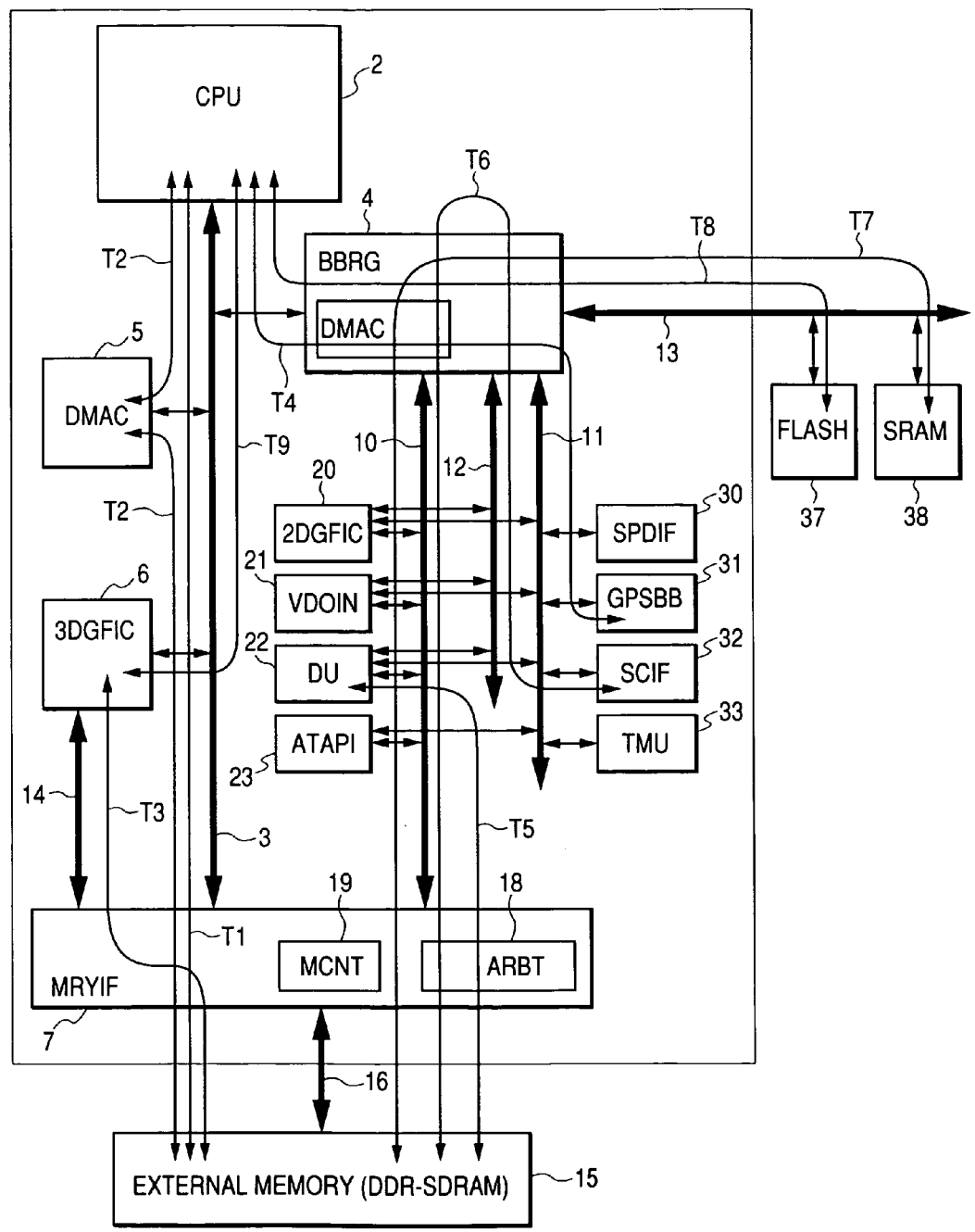
FIG. 4 is a diagram illustrating the flow of data in processing of the graphic data processor of FIG. 1.

FIG. 4 shows the flow of data in processing of the graphic data processor 1 in FIG. 1. Many circuit modules need transfer to/from the external memory 15 and the CPU 2. Kinds of the transfer are roughly divided into T1 to T8. The transfer T1 relates to an access of the CPU 2 to the external memory 15, which is concretely reading and rewriting of a cache memory in the CPU 2. The transfer T2 is a transfer by the DMAC 5 and uses the CPU 2 or external memory 15 as a source (transfer source) or destination (transfer destination). The transfer T3 is a transfer of graphics data between the 3D graphics module 6 and the external memory 15. The transfer T4 relates to an PIO access to one of the peripheral circuit modules 30 to 33 from the CPU 2. The transfer T5 is a graphics data transfer between one of the graphic processing circuit modules 20 to 23 and the external memory 15. The transfer T6 is a DMA transfer between one of the peripheral circuit modules 30 to 33 and the external memory 15. The transfer T7 is a DMA transfer between a circuit module on the external bus 13 and the external memory 15. The transfer T8 relates to a PIC access transfer from the CPU 2 to a circuit module on the external bus 13. The transfer T9 is a transfer of vertex data from the CPU 2 to the 3D graphics module 6.

A connection bus to the memory interface circuit 7 is divided into three systems of the first bus 3, second bus 10, and 3D dedicated bus 14. The memory interface circuit 7 has a data FIFO buffer for each of the buses, thereby preventing occurrence of waiting of transfer operation on each of the buses as much as possible. Thus, the transfers T1 to T8 can be made efficiently.

Combinations of the transfer modes in which, during transfer between the CPU 2 and a circuit module, data can be transferred between another circuit module and the external memory 15 are the following 21 transfer modes: [1] T1 and T6 or T2 and T6 (*), [2] T1 and T5 or T2 and T5 (*), [3] T1 and T7 or T2 and T7 (*), [4] T1 and T3 or T2 and T3 (*), [5] T2 and T8, [6] T4 and T7, [7] T4 and T3, [8] T4 and T6, [9] T4 and T5, [10] T4 and T2, [11] T3 and T7 (*), [12] T3 and T5 (*), [13] T3 and T6 (*), [14] T3 and T8, [15] T5 and T8, [16] T6 and T8, [17] T7 and T8, [18] T9 and T3, [19] T9 and T5, [20] T9 and T6, and [21] T9 and T7. The mark * indicates assumption that the external bus 16 to the external memory 15 taking the form of a DDR-SDRAM has a sufficiently wide transfer bit width.

On the contrary, combinations in which simultaneous transfer cannot be performed are only T1 and T2, T5 and T6, T5 and T7, T7 and T6, and T9 and T2. In the comparative example of FIG. 2, the transfer modes of T1, T4, T5, T6, T7, and T8 can be defined. The transfers of T1 and T5, T1 and T7, and T4 and T7 use the same bus and simultaneous transfer cannot be performed. By employing the configuration shown in FIG. 1, the transfers of T1 and T5, T1 and T7, and T4 and T7 can be also performed. Further, also in the transfers of T2, T3, and T9, bus collision is minimized. Therefore, transfer of a large volume of graphic data, higher-speed PIO access from the CPU 2, and simultaneous execution of DMA transfers without using the CPU 2 can be realized. As compared with the comparative example, the system performance can be improved largely.

Drawing of Thick Line

Figure 5:
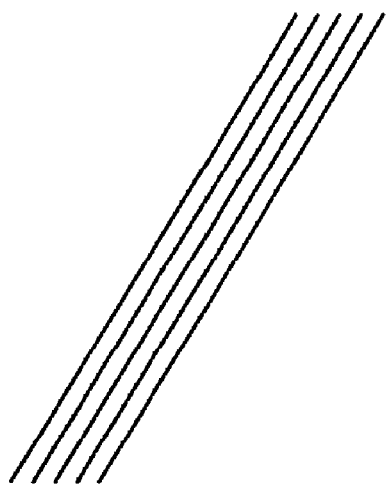
FIG. 5 is a diagram showing a state where in the case of employing a method of filling pixels from a start point to an end point with color while the process moves between the start and end points, even when the number of lines in which pixels are filled with color from the start point to the end point is the same, if the drawing directions are different, the widths of the thick lines are different from each other.
Figure 5:
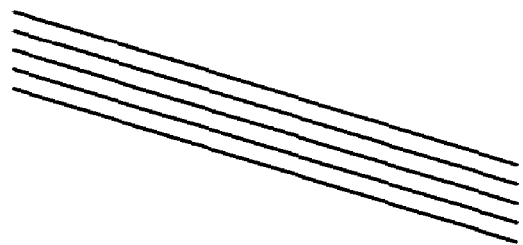
Figure 5:
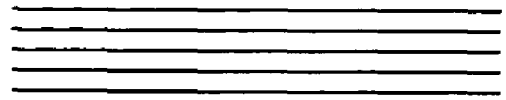

Drawing of a thick line by the 2D graphics module 20 will now be described. At the time of drawing a thick line, in the case of employing the method of filling pixels from the start point to the end point with color while moving between the start point and the end point, if directions of drawing are different from each other as shown in FIG. 5, even if the number of lines in which pixels from the start point to the end point are filled with color are the same, the width of a thick line varies. The difference of $\sqrt{2}$ times at the maximum occurs.

Figure 6:
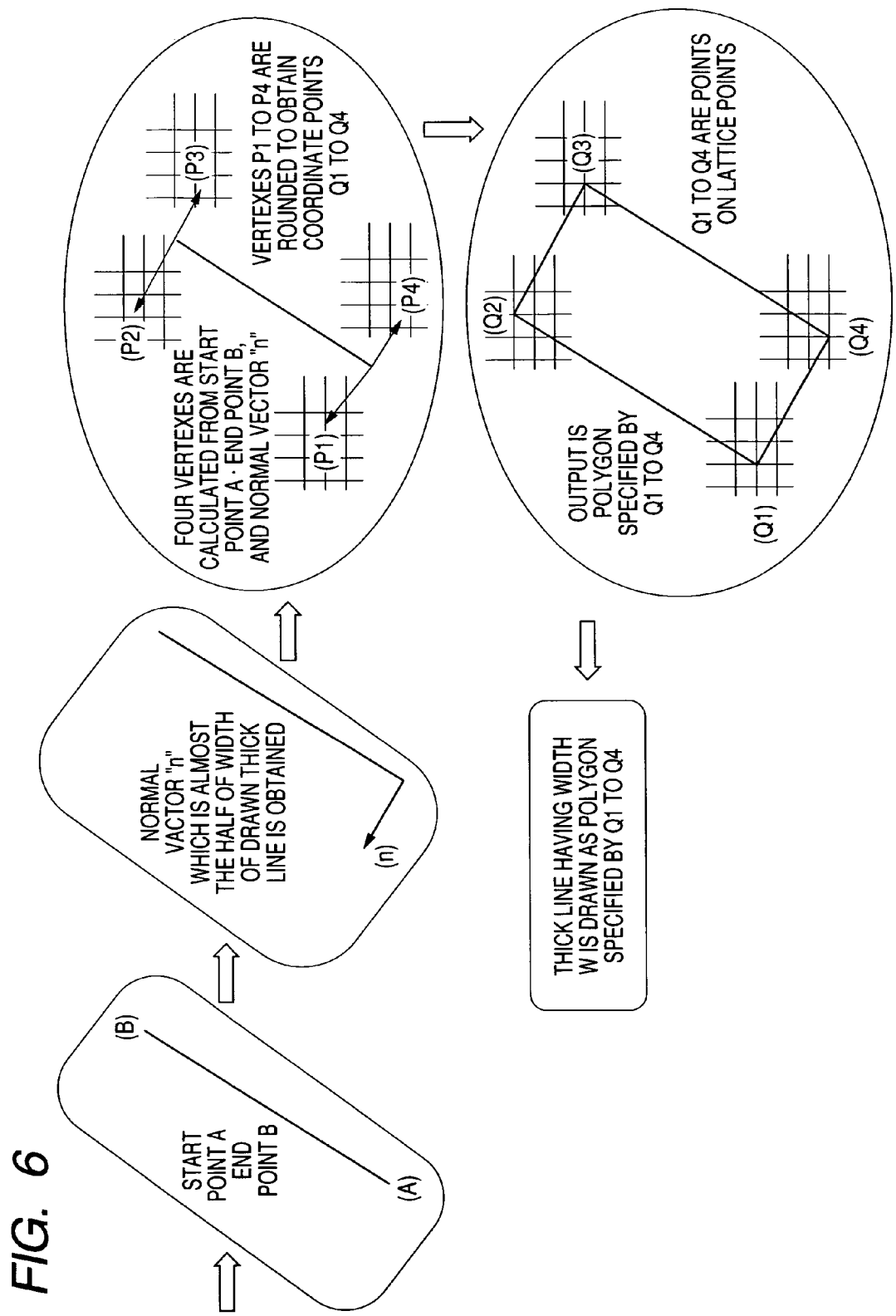
FIG. 6 is a process drawing showing an outline of a basic procedure of thick line drawing by a 2D graphics module.

FIG. 6 shows an outline of a basic procedure of drawing a thick line by the 2D graphics module 20. By the start and end points A and B, the direction of drawing is specified. A normal vector "n" of a line segment AB having a length which is, for example, the half of the drawing width is calculated. Four vertexes P1, P2, P3, and P4 of a rectangle are computed from the start and end points A and B and the normal vector "n". The four vertexes P1, P2, P3, and P4 are logical coordinate points. By rounding off the four vertexes P1, P2, P3, and P4, pixel coordinate points Q1, Q2, Q3, and Q4 corresponding to the pixels are obtained. The pixel coordinate points Q1, Q2, Q3, and Q4 are coordinates on the lattice points of the pixels. The region defined by the pixel coordinate points Q1, Q2, Q3, and Q4 is drawn as a polygon.

Figure 7:
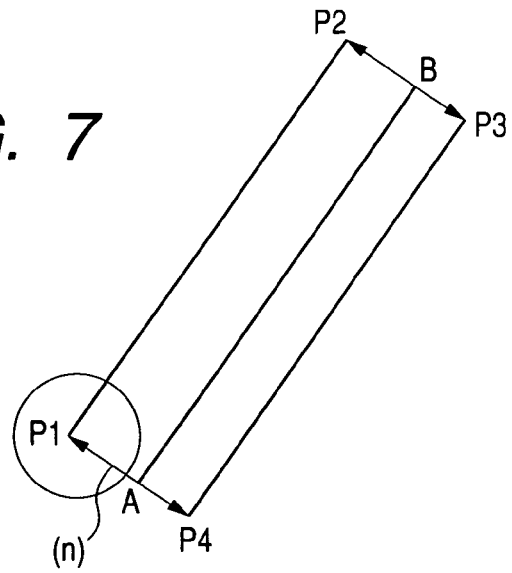
FIG. 7 is a diagram showing a rectangular region of thick line drawing by logic coordinates specified by the center line and normal vectors.
Figure 8:
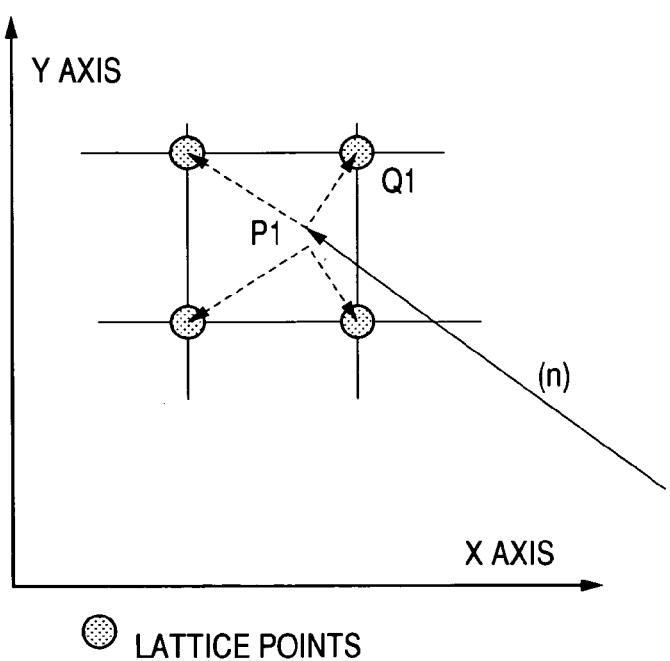
FIG. 8 is a diagram showing pixel coordinate points each assigned by rounding off the logic coordinate point of a lattice point of a pixel to the nearest integer in the X and Y directions within the pixel pitch.
Figure 9:
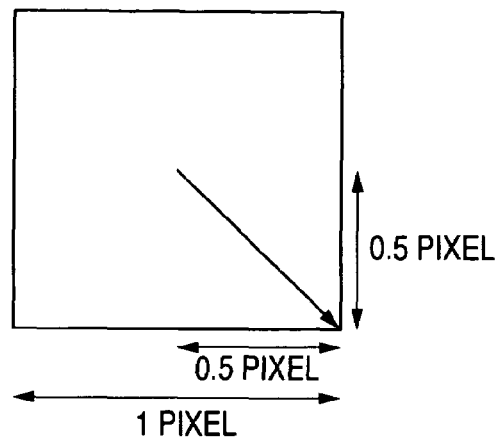
FIG. 9 is a diagram illustrating that a vertex coordinate point as logic coordinates and a pixel coordinate point are different from each other by $\pm\sqrt{2}/2$ of the pixel pitch at the maximum.
Figure 10:
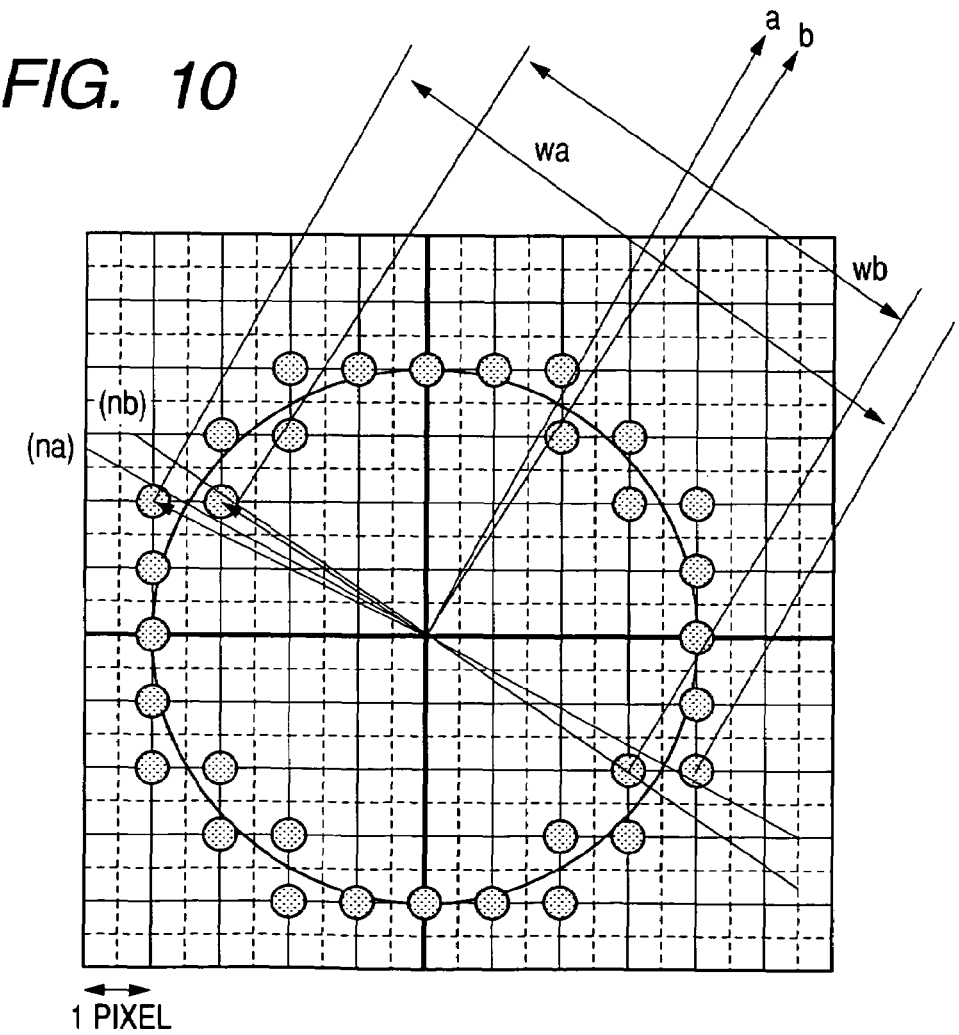
FIG. 10 is a diagram showing a state where the drawing width varies according to the drawing direction in the case of drawing a thick line having a width of nine pixels.

A rounding process by simple rounding a number to the nearest integer will be described as a comparative example. For example, attention is paid to an X coordinate and a Y coordinate of the vertex P1 as the sum of the start point coordinate A and the normal vector "n" in FIG. 7. As shown in FIG. 8, by rounding off the logic coordinate point P1 for lattice points of pixels in the X and Y directions in the range of pixel pitch, a pixel closest to P1 becomes the pixel coordinate point Q1. Therefore, as shown in FIG. 9, a vertex Pi and a pixel coordinate point Qi are different from each other by ± $\sqrt{2}/2$ of the pixel pitch at the maximum. Since P1 and P4 are line symmetrical with respect to the segment AB, so that errors of Q1 and Q4 from P1 and P4 become the same. In the width of the thick line, an error which is ± $\sqrt{2}$ times as large as the pixel pitch occurs. Even if the user tries to draw thick lines with the same width, there is the possibility that a difference of $2\sqrt{2}$ times as large as the pixel pitch occurs in the thickness of lines depending on the drawing directions and the positions of the start and end points. For example, as shown in FIG. 10, in the case of drawing a thick line having a width corresponding to nine pixels, a normal vector in the direction na is determined with respect to the direction "a", and a normal vector in the direction nb is determined with respect to the direction "b". If the end point of the vector is not on a lattice point of a pixel, the end point is assigned to a lattice point of a pixel by a rounding process. In the case of executing the rounding the point to the nearest integer, a thick line having a width wa is drawn in the direction "a", and a thick line having a width wb is drawn in the direction "b". Even if thick lines having the same width are intended to be drawn, the line width varies according to the drawing directions. In the case of drawing a thick line as a road on a map in a navigation system, the thickness of a road having the same width changes according to the directions or when the road curves, and the display performance of roads and the like cannot help deteriorating.

In drawing of a thick line by the 2D graphics module 20, to solve the problem, first, a rounding process of determining a rounding direction two-dimensionally is employed. Second, lengths of normal vectors are made asymmetric with respect to the center line.

Figure 11:
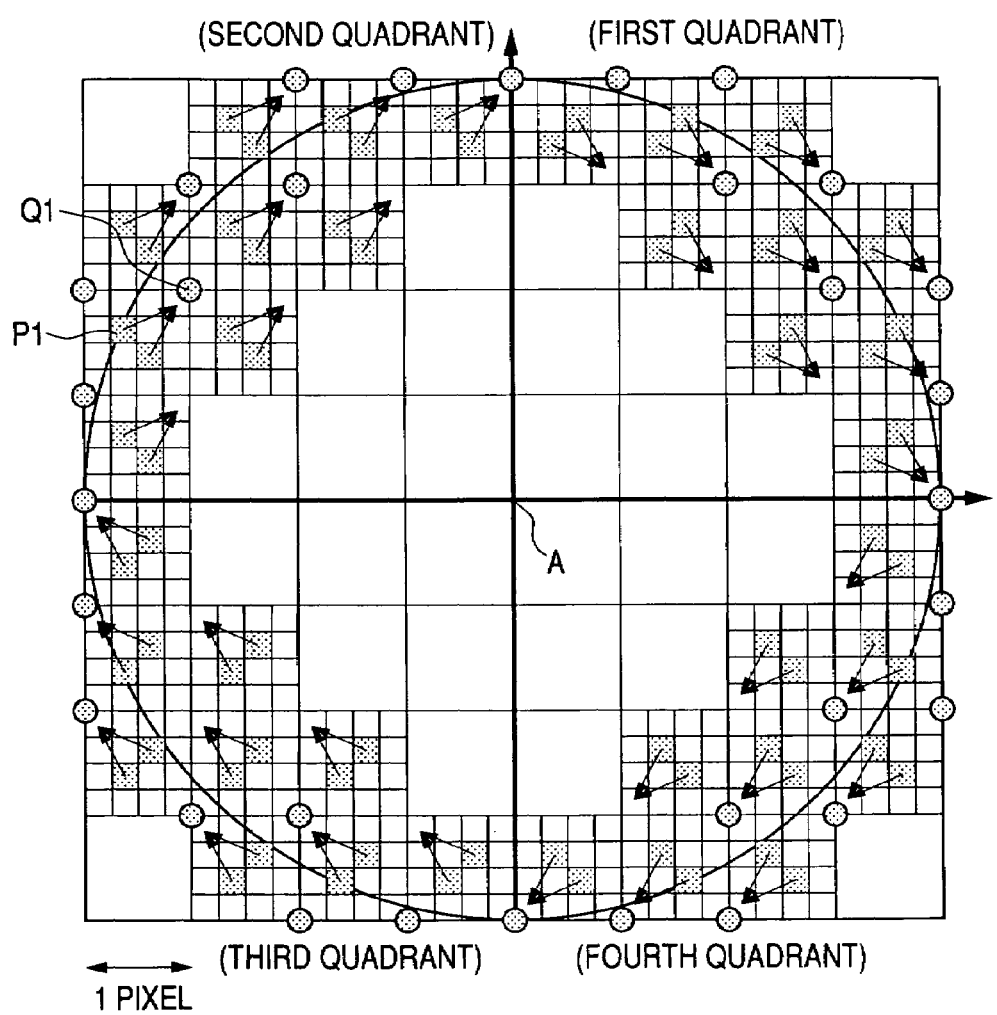
FIG. 11 is a diagram showing the principle of a two-dimensional normal vector rounding process.

Determination of the two-dimensional rounding direction will now be described. FIG. 11 shows the principle of a two-dimensional normal vector rounding process. For example, a region formed by four pixel lattice points is divided into 16 parts. With respect to predetermined parts (parts to be subjected to exceptional rounding) in the hatched center portion in a divided part, the rounding direction is changed exceptionally to a pixel indicated by an arrow (exceptional rounding process). In the other cases, normal rounding process by rounding to the nearest integer is performed, thereby determining pixel coordinates. For example, when a logic coordinate point like P1 is in a hatched square part, the position of the pixel shown by the arrow is set as a corresponding pixel coordinate point Q1. As understood from the directions of arrows in FIG. 11, the rounding direction is a direction of tangent of a circle having a drawing width as a diameter (thick line drawing direction). The center portion of four pixel lattice points is a portion in which a relatively large error is caused by the rounding process. Even when the rounding process is performed on such a portion, the length of the normal (width of the thick line) is just prevented from being increased/decreased by the rounding process. The rounding direction is determined according to a quadrant to which the drawing line width specifying vector as a normal vector belongs on a two-dimensional coordinate system using the start point (A) of the drawing line width specifying vector as a center. In short, the pixel coordinates Q1 and Q4 are determined according to the signs of the X coordinate point and the Y coordinate point of P1 and P4 on the XY coordinate system using the start point A as a center, and the pixel coordinates Q2 and Q3 are determined according to the signs of the X coordinate point and the Y coordinate point of P2 and P3 on the XY coordinate system using the end point B as a center. For example, it is sufficient to determine the rounding direction as follows. If the drawing line width specifying vector belongs to the first quadrant, the point is rounded to the right lower pixel. If the drawing line width specifying vector belongs to the second quadrant, the point is rounded to the right upper pixel. If the drawing line width specifying vector belongs to the third quadrant, the point is rounded to the left upper pixel. If the drawing line width specifying vector belongs to the fourth quadrant, the point is rounded to the left lower pixel.

Figure 12:
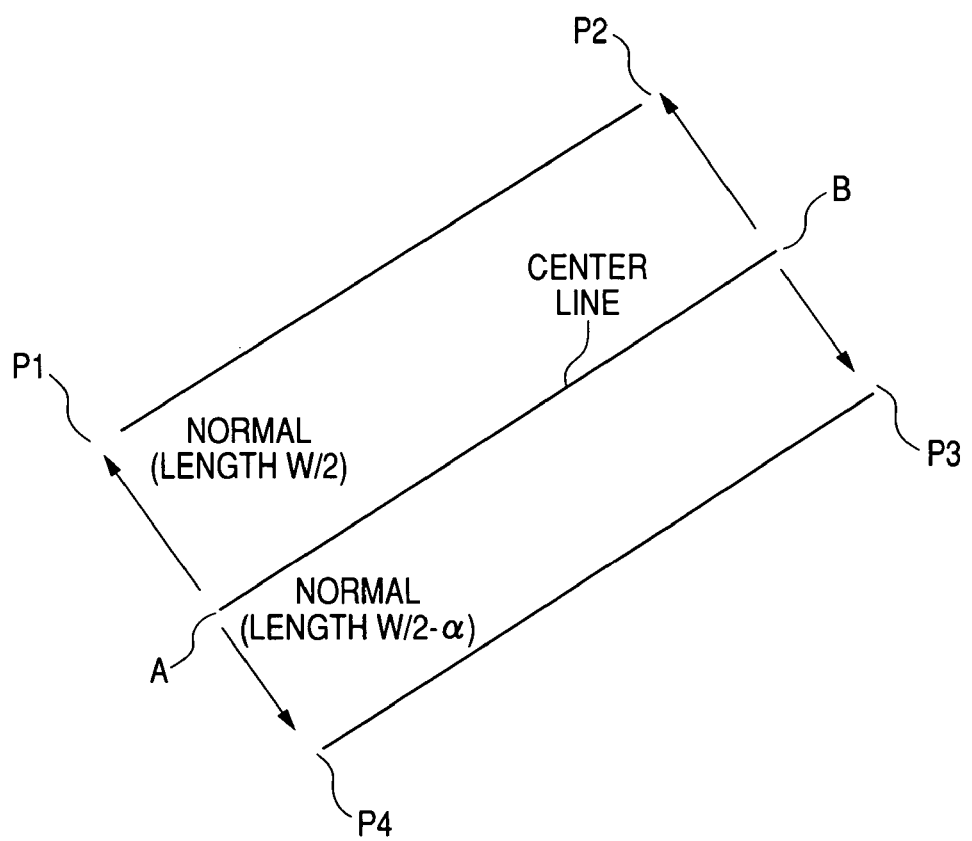
FIG. 12 is a diagram showing the meaning of making lengths of normal vectors asymmetric.
Figure 13:
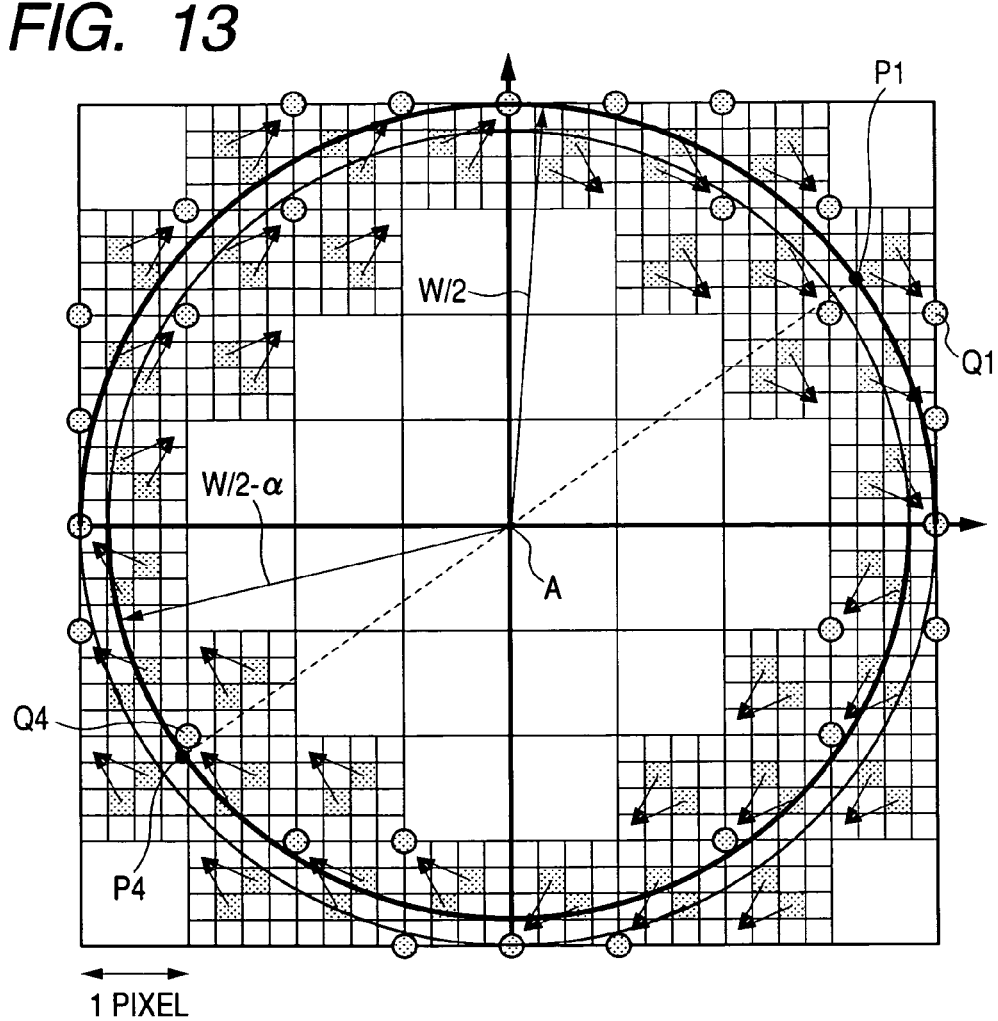
FIG. 13 is a diagram showing possible positions of logic coordinates P1 and P2 around the start point A as a center when the thick line width is 9 pixels.

To make lengths of normal vectors asymmetric with respect to the center line will be described. FIG. 12 shows the meaning of making lengths of the normal vectors asymmetric with respect to the center line. For example, when the drawing width of a thick line is set as W, the length of one of normal vectors with respect to the start point A is set as W/2, and the length of the other normal vector is set as W/2−α. For example, α is set as length of ¼ of the pixel pitch. FIG. 13 shows possible positions of the logic coordinates P1 and P2 with respect to the start point A as a center when the thick line width corresponds to nine pixels. By making lengths of normal vectors asymmetric with respect to the center line, in the case where the length of one of the normal vectors increases by the rounding process, the other normal vector tends to be rounded to be shorter. As a result, expansion/contraction of the drawing width is canceled off as a whole or is rather lessened. For example, when the coordinate points P1 and P4 in FIG. 13 are examined, Q1 corresponding to P1 is set as the right lower pixel coordinate, thereby making corresponding one of the normal vectors longer than the optimum length. Q4 corresponding to P4 is set to the closet pixel coordinate by rounding-off, the corresponding other normal vector is made shorter than the optimum length. As a result, fluctuations in the thick line width are suppressed.

Figure 14:
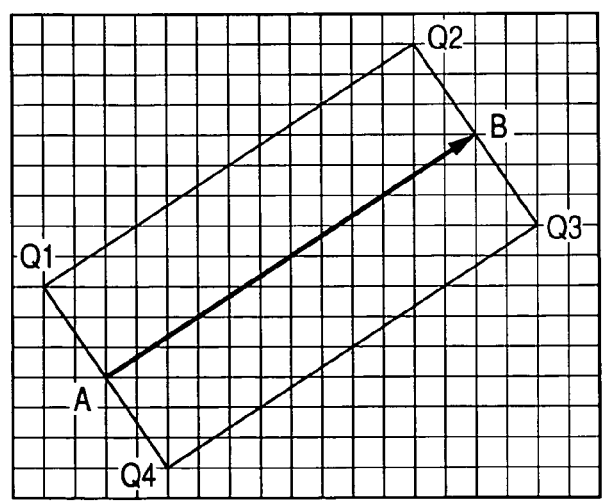
FIG. 14 is a diagram illustrating a first step of drawing a polygon of a region specified by pixel coordinate points Q1 to Q4.
Figure 15:
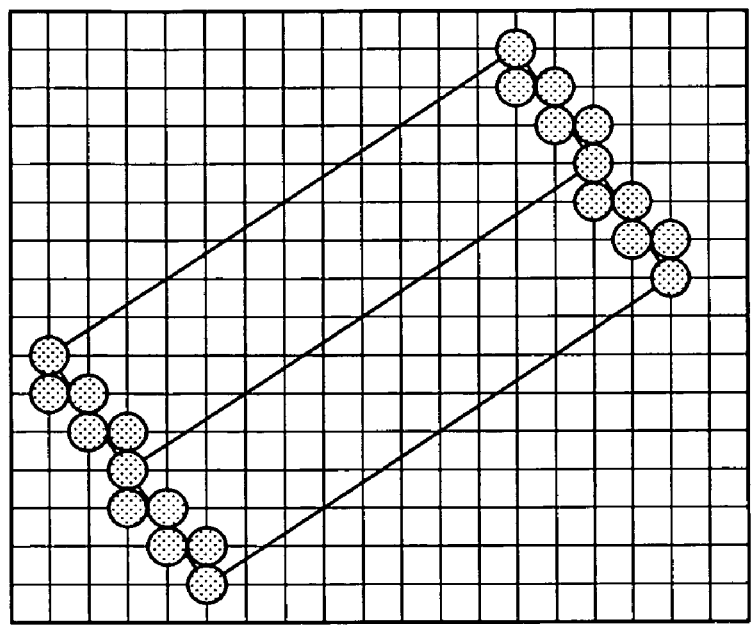
FIG. 15 is a diagram illustrating a second step of drawing the polygon of the region specified by the pixel coordinate points Q1 to Q4.
Figure 16:
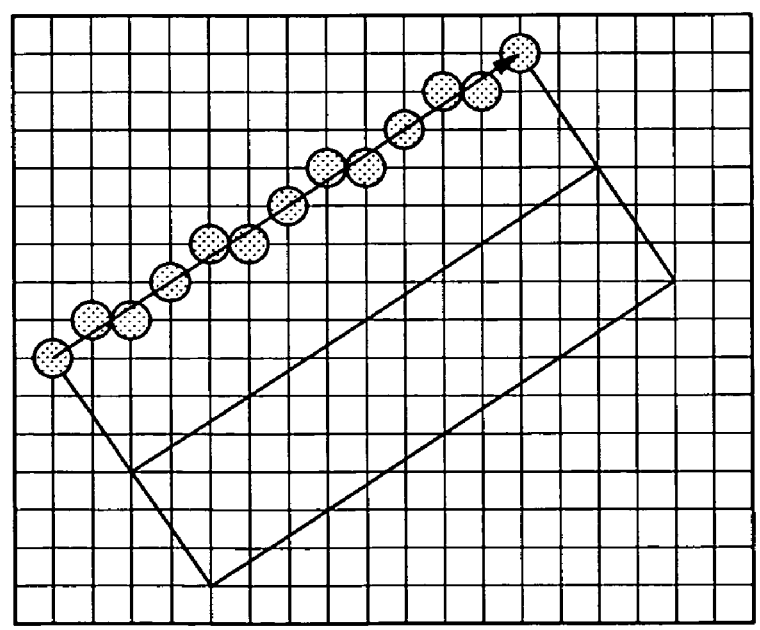
FIG. 16 is a diagram illustrating a third step of drawing the polygon of the region specified by the pixel coordinate points Q1 to Q4.
Figure 17:
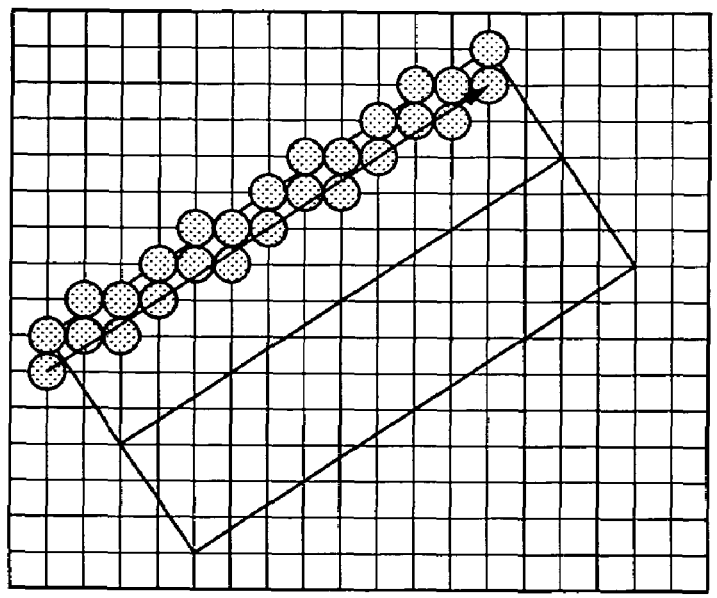
FIG. 17 is a diagram illustrating a fourth step of drawing the polygon of the region specified by the pixel coordinate points Q1 to Q4.
Figure 18:
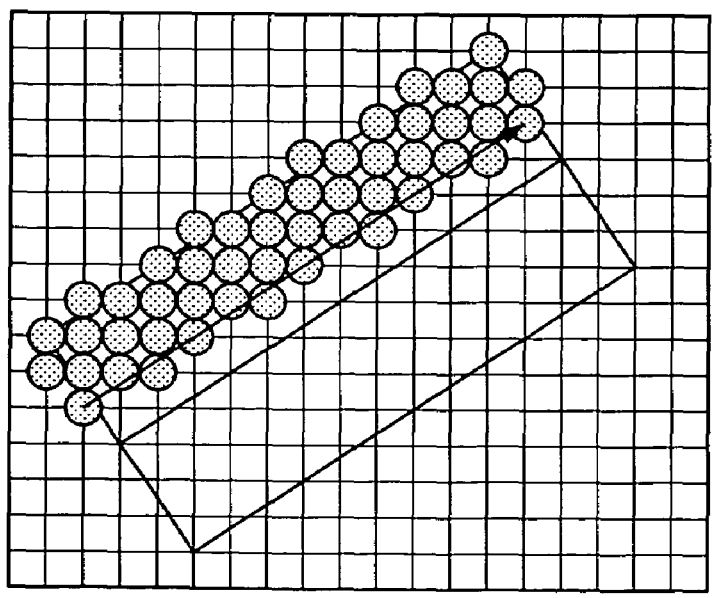
FIG. 18 is a diagram illustrating a fifth step of drawing the polygon of the region specified by the pixel coordinate points Q1 to Q4.
Figure 19:
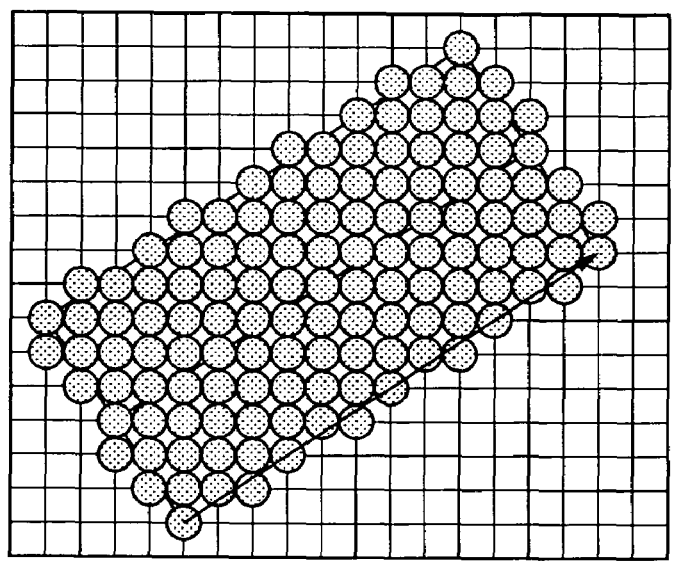
FIG. 19 is a diagram illustrating a sixth step of drawing the polygon of the region specified by the pixel coordinate points Q1 to Q4.
Figure 20:
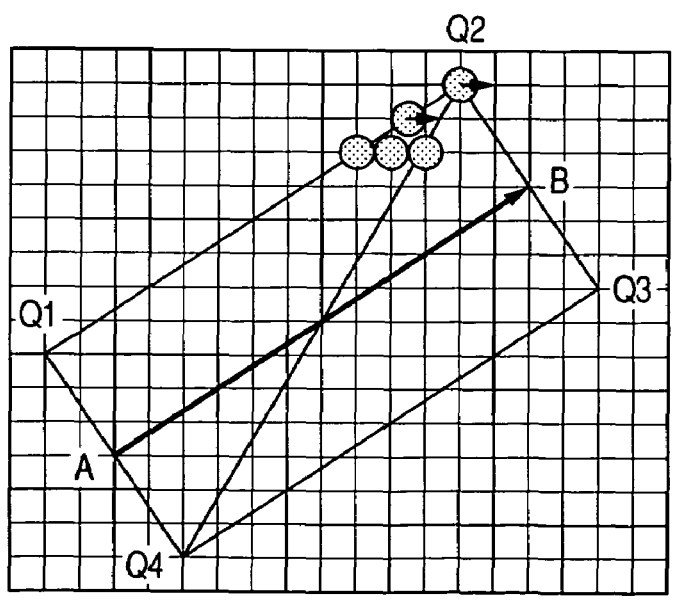
FIG. 20 is a diagram illustrating a first step of a process of drawing the polygon of the region specified by the pixel coordinate points Q1 to Q4 by filling a triangle with color.
Figure 21:
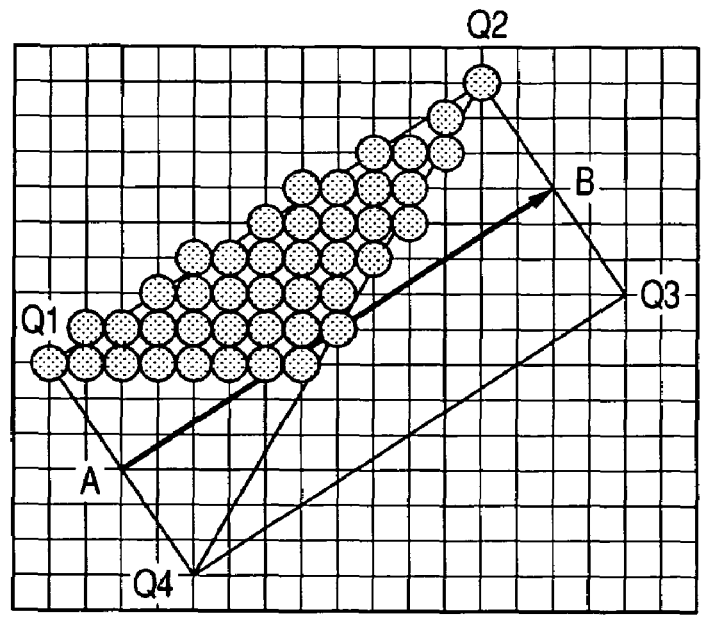
FIG. 21 is a diagram illustrating a second step of drawing the polygon of the region specified by the pixel coordinate points Q1 to Q4 by filling a triangle with color.
Figure 22:
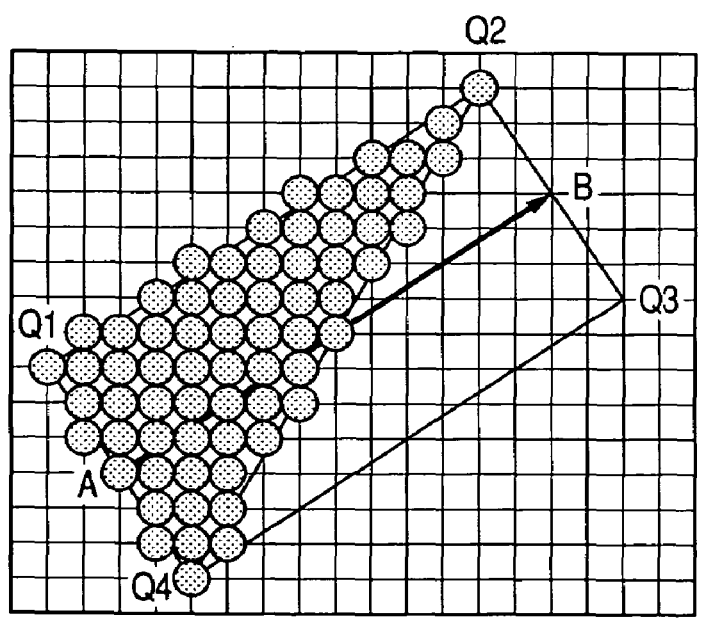
FIG. 22 is a diagram illustrating a third step of drawing the polygon of the region specified by the pixel coordinate points Q1 to Q4 by filling a triangle with color.

A polygon of the region specified by the pixel coordinate points Q1 to Q4 can be sequentially drawn, for example, as shown in FIGS. 14 to 19. For example, as shown in FIG. 14, four vertexes obtained in the case of drawing a segment extended from the start point A to the end point B as a thick line are set as Q1 to Q4. First, as shown in FIG. 15, coordinate points on segments extended from the vertex Q1 to the vertex Q4 are obtained. Similarly, coordinate points on a segment extended from the vertex Q2 to the vertex Q3 are computed. Straight lines are drawn between the coordinate points computed by the process. FIG. 16 shows a state where the first straight line is drawn. FIG. 17 shows a state where the second straight line is drawn. FIG. 18 shows a state where the fourth straight line is drawn. FIG. 19 shows a state where the final straight line is drawn. As another method, a polygon may be drawn by sequentially filling pixels with colors so as to scan a divided triangle sequentially from the top in the X direction as shown in FIGS. 20 to 22.

Figure 23:
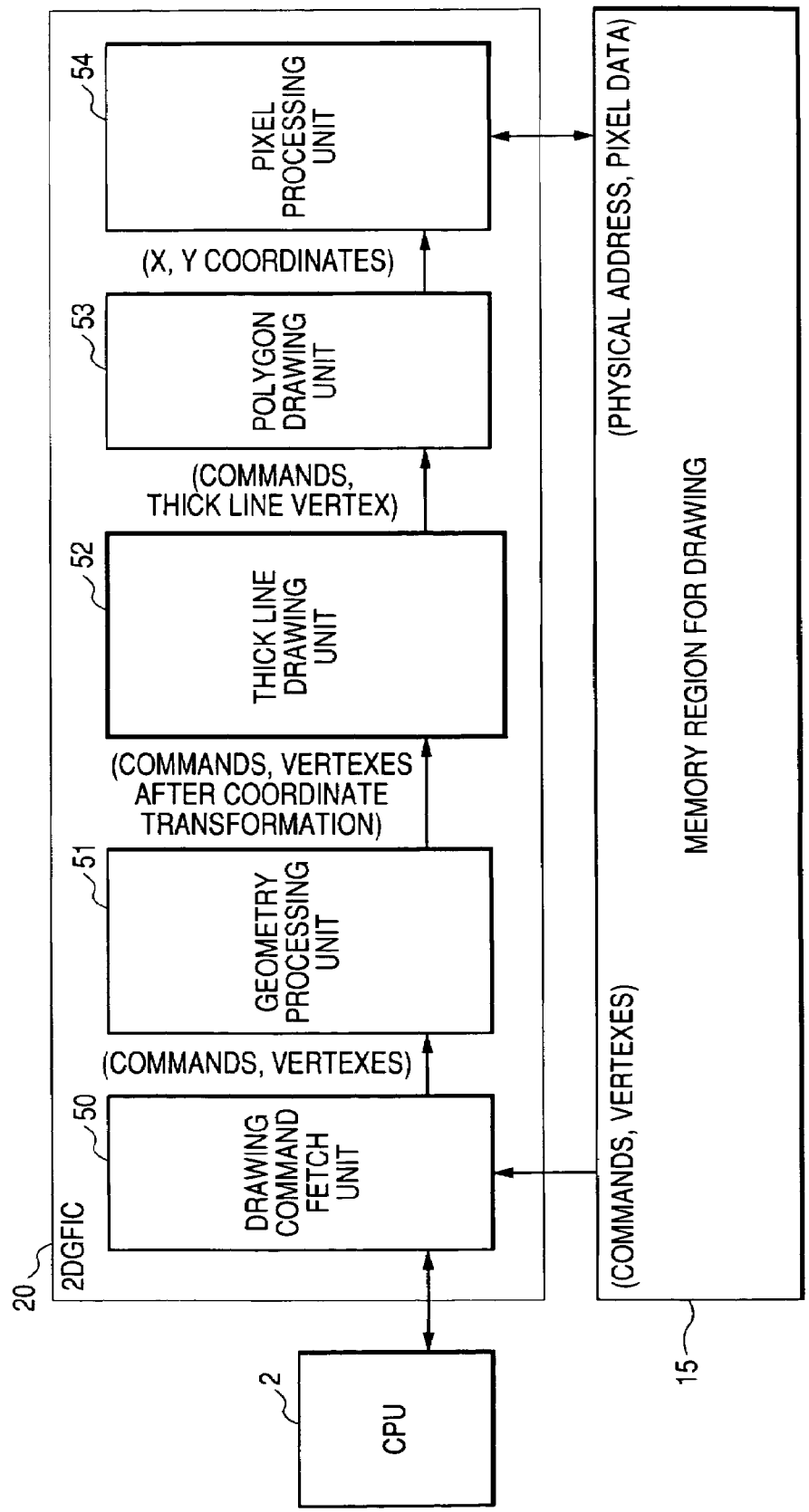
FIG. 23 is a block diagram showing an example of a 2D graphics module.

FIG. 23 is a block diagram showing the 2D graphics module 20. The 2D graphics module 20 has a drawing command fetch unit 50, a geometry processing unit 51, a thick line drawing unit 52, a polygon drawing unit 53, and a pixel processing unit 54. The connecting forms of the CPU 2 and the external memory 15 to the 2D graphics module 20 are shown in a simplified manner.

The CPU 2 starts the 2D graphics module 20, reading of a register, and the like. The drawing command fetch unit 50 fetches a graphic command, coordinates of a drawing figure, and the like stored in a memory region for graphics in the external memory 15. The geometry processing unit 51 performs a process of converting figure coordinates to screen coordinates. The thick line drawing unit 52 performs a process for drawing a thick line in accordance with a thick line drawing command. Data obtained by the polygon drawing unit 53 is converted to pixel data by the pixel processing unit 54, stored together with its physical address into the memory region for graphics in the external memory 15, and provided for graphic display.

Figure 24:
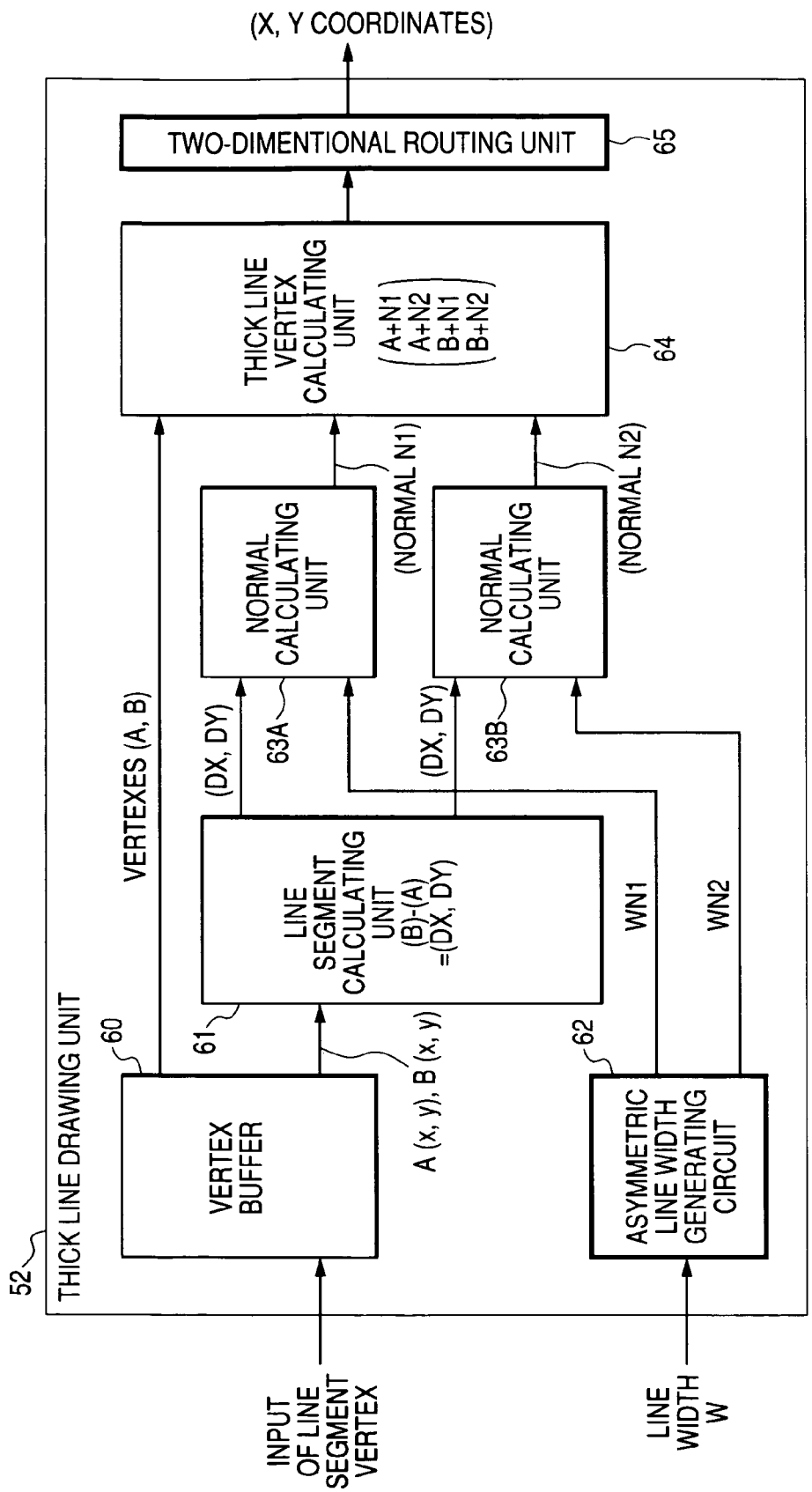
FIG. 24 is a block diagram showing an example of a thick line drawing unit.

FIG. 24 shows an example of the thick line drawing unit 52. To a vertex buffer 60, vertex coordinates A(x, y) and B(x, y) of a segment are input. A line segment calculating unit 61 calculates a line segment having the start point A(x, y) and the end point B(x, y) as A(x, y)−B(x, y)=DX, DY. An asymmetric line width generating circuit 62 receives information of the line width W and outputs information WN1 and WN2 of asymmetric line widths. A normal calculating unit 63A calculates a normal N1 having the line width WN1 in the direction normal to the line segment DX, DY. A normal calculating unit 63B calculates a normal N2 having the line width WN2 in the direction normal to the line segment DX, DY. A thick line vertex calculating unit 64 calculates four vertexes A+N1, A+N2, B+N1, and B+N2. The calculated four vertexes are rounded by a two-dimensional rounding unit 65.

Figure 25:
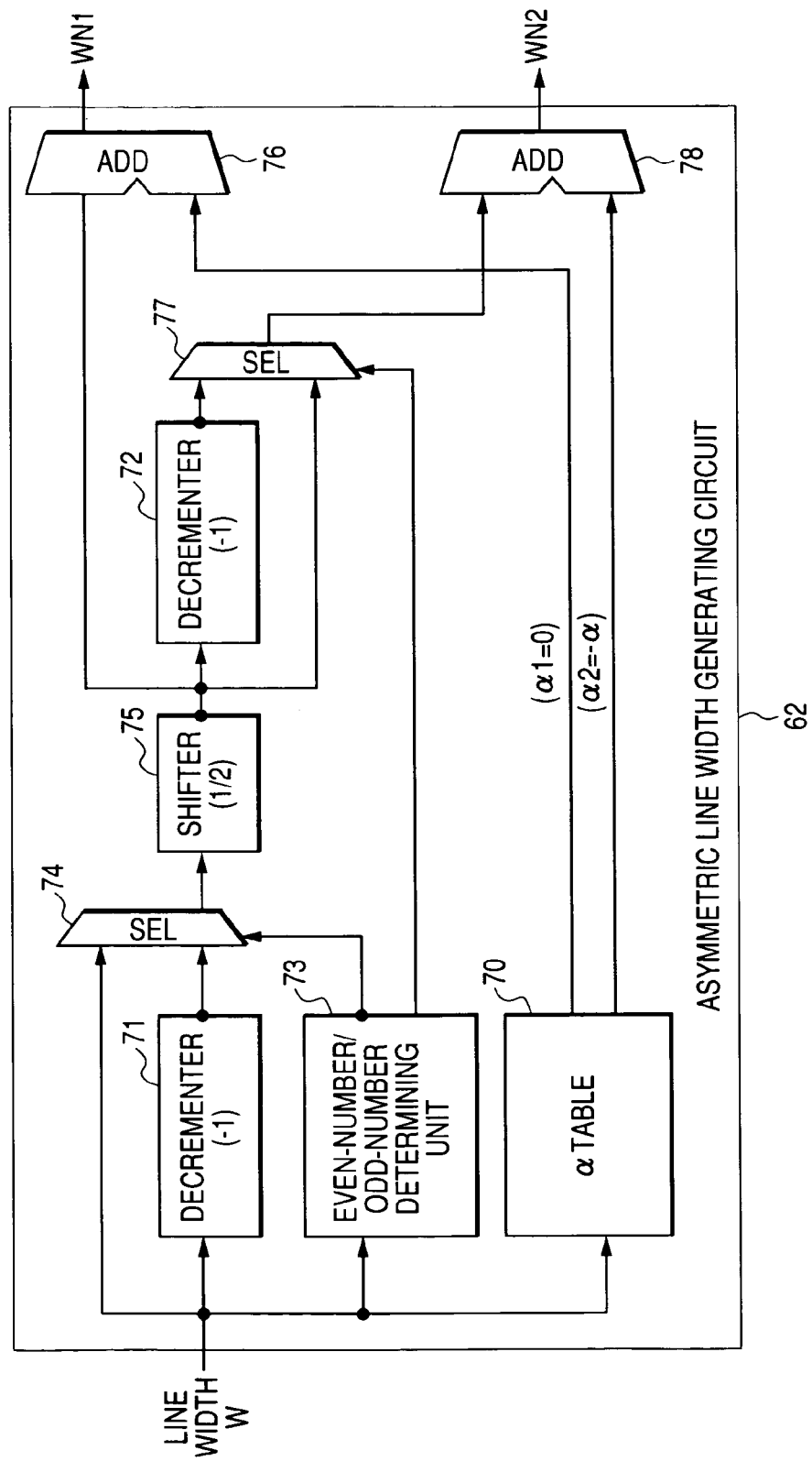
FIG. 25 is a block diagram showing an example of an asymmetric line width generating circuit.

FIG. 25 shows an example of the asymmetric line width generating unit 62. Each of the line widths WN1 and WN2 varies according to whether the number of pixels of the drawing width is an odd number or even number. In this case, when the number of pixels of the line width W is an odd number, WN1 is set as (W−1)/2 and WN2 is set as (W−1)/2−α. When the number of pixels of the line width W is an even number, WN1 is set as W/2 and WN2 is set as W/2−1−α. α denotes a constant for making normal lines determined for each line width asymmetric. The constant α is stored in an α table 70. A constant α according to the line width W is selected and output. In this case, it is assumed that an output α1 for line width WN1 is 0, and an output α2 for line width WN2 is −α. Although not shown, both of line widths can be increased/decreased in such a manner that the output α1 for the line width WN1 is set as +α/2 and the output α2 for line width WN2 is set as −α/2.

Each of decrementers 71 and 72 decrements an input by one and outputs the resultant. An even-number/odd-number determining unit 73 determines whether the number of pixels of the line width W is an odd number or even number. If the number of pixels is an odd number, the output of the decrementer 71 is selected by a selector 74 and is set to ½ by a shifter 75. The result (W−1)/2 is added to α1=0 by an adder (ADD) 76, thereby outputting WN1. When the number of pixels is an odd number, on the WN2 side, the output (W−1)/2 of the shifter 75 is selected by a selector 77, the result (W−1)/2 is added to α2=−α by an adder (ADD) 78, and WN2 is output. When the pixel number of the line width W is determined as an even number by the even-number/odd-number determining unit 73, the line width W is selected as it is by the selector 74 and is set to ½ by the shifter 75. The resultant W/2 is added to α1=0 by the adder (ADD) 76, and WN1 is output. On the WN2 side, the output W/2−1 of the decrementer 72 is selected by the selector 77 and is added to α2=−α by the adder (ADD) 78, and WN2 is output.

Figure 26:
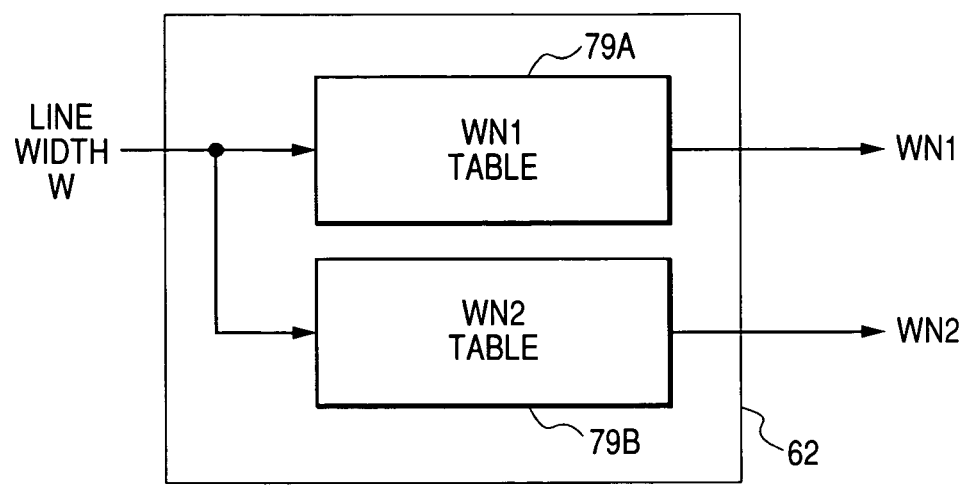
FIG. 26 is a block diagram showing another example of the asymmetric line width generating circuit.

FIG. 26 shows another example of an asymmetric line width generating circuit 62. The asymmetric line width generating circuit 62 is constructed in such a manner that a WN1 table 79A and a WN2 table 79B having line widths WN1 and WN2, respectively, according to the line width W are disposed and the line widths WN1 and WN2 are output directly in accordance with the input line width W.

Figure 27:
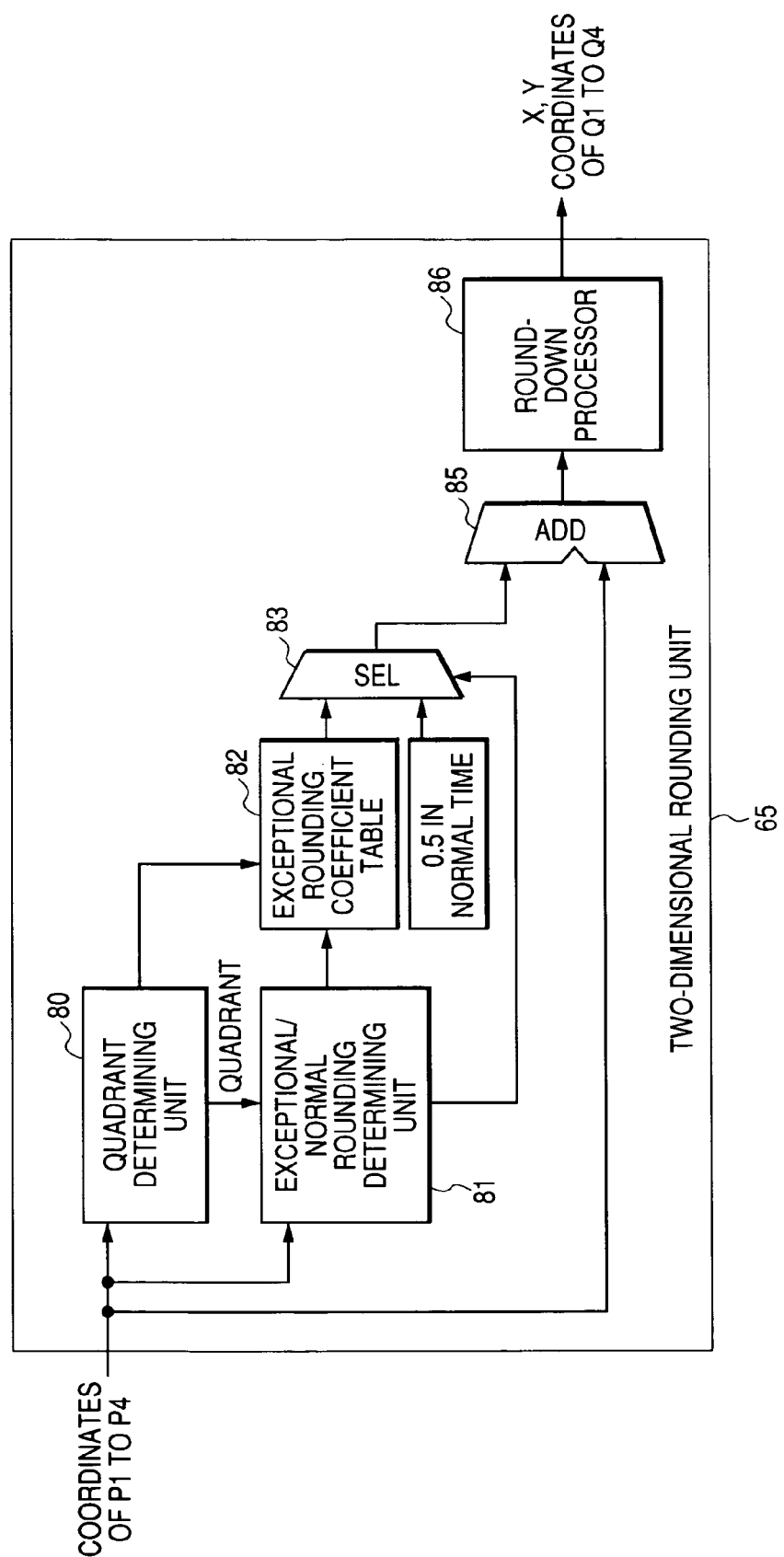
FIG. 27 is a block diagram showing an example of a two-dimensional rounding unit.

FIG. 27 shows an example of the two-dimensional rounding unit. On the basis of x coordinate points and y coordinate points of the four vertex points P1 to P4 calculated by the thick line vertex calculating unit 64, a quadrant in which each of the vertex coordinates is positioned is obtained by a quadrant determining unit 80. The quadrant denotes the same as that described above with reference to FIG. 11. An exceptional rounding coefficient table 82 stores a coefficient (exceptional rounding coefficient) to be added to the coordinate points of P1 to P4 and outputs an exceptional rounding coefficient (x, y)=(m, n) in accordance with the result of quadrant determination. The exceptional rounding coefficients are according to the rule shown in FIG. 11 and are (1, 0) for the first quadrant, (1, 1) for the second quadrant, (0, 1) for the third quadrant, and (0, 0) for the fourth quadrant. An exceptional/normal rounding determining unit 81 determines whether the four vertexes P1 to P4 lie in the exceptional rounding portion in a region obtained by dividing the lattice of pixels into 16 regions as described by referring to FIG. 11. In the case where the vertex is to be subjected to exceptional rounding process, an output of the exceptional rounding coefficient table 82 is selected by a selector 83. In the case where the vertex is to be subjected to normal rounding process, (0.5, 0.5) is selected by the selector 83. An output of the selector 83 and the corresponding vertex coordinate are added to each other by an adder (ADD) 85, and the fractional portion of the result of addition is dropped by a round-down processor 86. An output of the round-down processor 86 is used as pixel coordinate point information of Q1 to Q4.

In the method of computing a vector perpendicular to the direction of drawing a thick line and having a length which is ½ of the line width, obtaining four vertexes of the thick line from a start point, an end point, and the vector, and drawing a polygon, at the time of obtaining the normal vector having a length which is ½ of the line width, the normal vector is obtained as coordinates of decimal points. However, the drawing coordinate has to be an integer, so that the coordinate of a decimal point has to be rounded by rounding off the number to the nearest integer. With the resolution of the display, due to the rounding-off of the number to the nearest integer or the like, the thick line is seen rather thick or thin depending on the drawing direction. In contrast, in the thick line drawing process by the 2DGFIC 20, by making the right and left parts asymmetrical with respect to the center of the thick line and performing rounding-off two-dimensionally in consideration of the axis to which a coordinate value is rounded without rounding coordinate values to one of the X and Y axes, a thick line can be drawn without variations in thickness in all of directions even at low resolution.

Therefore, lines having substantially uniform thickness can be drawn in all of directions. In the case of simply rounding off a coordinate value to the nearest integer, an error off about $\pm\sqrt{2}$ pixels from the target line width occurs in the worst case. The line width difference between the thickest portion and the thinnest portion is $2\sqrt{2}$ pixels. However, by employing the rounding process, the line width difference between the thickest portion and the thinnest portion can be reduced to about $2\sqrt{2}$.

Since road information which occupies most of a map and is the most important thing for navigation can be expressed clearly with uniform thickness, the whole map can be seen more clearly. Since a line can be drawn with uniform thickness, by trimming a road, ease of seeing can be further improved and additional information such as one-way traffic, traffic jam information, and the like can be added so as to be seen easily. Ease of seeing of a map is effective for safety driving and is an additional value of a car navigation system itself.

Although the invention achieved by the inventors herein has been described above concretely on the basis of embodiments, obviously, the invention is not limited to the embodiments but can be variously changed without departing from the gist.

For example, the CPU is not limited to a super scalar CPU. The second bus is not limited to a super highway bus. The first and second circuit modules are not limited to the circuit modules having the functions as shown in FIG. 1.

The application of the invention is not limited to the car navigation system. The invention can be widely applied to various data processing systems having graphic display.

The effects obtained by representative ones of the inventions disclosed in the specification will be briefly described as follows.

Transfer efficiency of control information, image data, and the like for drawing and display control can be improved.

Deterioration in the data transfer efficiency due to competition on a transfer path of graphic information and control information can be suppressed.

The data processing performance of a graphic data processor can be improved by enabling real-time drawing and display control on a large volume of graphic data.

What is claimed is:

1. A graphic data processor formed on a semiconductor chip, comprising:
    a central processing unit;
    a first bus coupled to said central processing unit;
    a direct memory access controller for controlling a data transfer using said first bus;
    a bus bridge circuit for transmitting/receiving data to/from said first bus;
    a three-dimensional graphics module coupled to the first bus for receiving a command from said central processing unit via said first bus and performing a three-dimensional graphic process;
    a second bus coupled to said bus bridge circuit and a plurality of first circuit modules;
    a third bus coupled to said three-dimensional graphics module; and
    a memory interface circuit coupled to said first bus, said second bus, and said three-dimensional graphics module via said third bus directly, and capable of being coupled to an external memory,
    wherein said bus bridge circuit is capable of controlling a direct memory access transfer between a circuit coupled to the outside of the semiconductor chip and said second bus, and
    wherein said memory interface circuit arbitrates access between said external memory and said central processing unit for transferring data to/from said external memory, between said external memory and said three-dimensional graphics module for receiving data from said external memory via said third bus independently from said first bus and said second bus, and between said external memory and one of said first circuit modules for receiving data from said external memory via said second bus independently from said first bus and said third bus.

2. The graphic data processor according to claim 1, further comprising a fourth bus which is coupled to said bus bridge circuit and is capable of being used for register setting from said central processing unit to the plurality of first circuit modules.

3. The graphic data processor according to claim 2, wherein said bus bridge circuit is also capable of executing a data transfer between said second and fourth buses.

4. The graphic data processor according to claim 1, wherein said central processing unit has a super scalar configuration capable of executing two commands in one cycle, wherein two sets of data of predetermined number of bits are prepared in a processing cycle of said central processor unit, and wherein the prepared two sets of data can be transferred to the first bus in one bus cycle.

5. The graphic data processor according to claim 1, wherein said plurality of first circuit modules comprises a two-dimensional graphics module.

6. The graphic data processor according to claim 5, wherein said plurality of first circuit modules further comprises a display controller for performing display control on graphic data generated by said two-dimensional or three-dimensional graphics module.

7. The graphic data processor according to claim 3, further comprising a plurality of second circuit modules including a GPS module coupled to said fourth bus.

8. The graphic data processor according to claim 5, wherein at the time of drawing a thick line, said two-dimensional graphics processor obtains a drawing line width specifying vector for specifying drawing line width in a direction perpendicular to a center line specifying a drawing direction, obtains a rectangle of a thick line based on a start point and an end point of the center line and said drawing line width specifying vector, obtains drawing coordinates of four vertexes corresponding to pixels by performing a rounding process on logic coordinates of the four vertexes of the rectangle, and draws a region surrounded by the drawing coordinates of the four vertexes as a polygon.

9. The graphic data processor according to claim 8, wherein said two-dimensional graphics module obtains a drawing line width specifying vector so that right and left parts of the vector become asymmetrical with respect to the center line in the drawing direction.

10. The graphic data processor according to claim 3, wherein the memory interface circuit arbitrates access among said first bus, said second bus, and said fourth bus to said external memory using a multi-level arbitration algorithm.

11. The graphic data processor according to claim 10, wherein the memory interface circuit arbitrates access among said plurality of first devices to said second bus and among said plurality of second circuit modules to said fourth bus.

12. The graphic data processor according to claim 1, wherein said third bus is coupled only to said memory interface circuit and said three dimensional graphics module.

* * * * *